(12) United States Patent
Meyer et al.

(10) Patent No.: US 10,272,720 B2
(45) Date of Patent: Apr. 30, 2019

(54) WHEEL SUPPORT HAVING A TRANSDUCER SENSOR BODY

(71) Applicant: MTS Systems Corporation, Eden Prarie, MN (US)

(72) Inventors: Richard Alan Meyer, Chaska, MN (US); Glenn Arthur Lucachick, Bloomington, MN (US); Matthew David Slama, Maple Plain, MN (US); Robbin Scott Roberts, St. Michael, MN (US)

(73) Assignee: MTS SYSTEMS COPORATION, Eden Prairie, MN (US)

( * ) Notice: Subject to any disclaimer, the term of this patent is extended or adjusted under 35 U.S.C. 154(b) by 0 days.

(21) Appl. No.: 15/389,825

(22) Filed: Dec. 23, 2016

(65) Prior Publication Data

US 2017/0182842 A1 Jun. 29, 2017

Related U.S. Application Data

(60) Provisional application No. 62/387,376, filed on Dec. 23, 2015.

(51) Int. Cl.
*B60B 35/04* (2006.01)
*B60B 35/00* (2006.01)
(Continued)

(52) U.S. Cl.
CPC .......... *B60B 35/004* (2013.01); *B60B 35/003* (2013.01); *B60B 35/025* (2013.01);
(Continued)

(58) Field of Classification Search
CPC ... B60B 35/004; B60B 35/025; B60B 35/003; B60B 35/04; G01L 5/161; G01L 1/2206; G01M 1/10; B60Y 2400/305
See application file for complete search history.

(56) References Cited

U.S. PATENT DOCUMENTS 2,209,804 A * 7/1940 Ashley ................. B60B 35/003
172/507
3,377,849 A 4/1968 Lebow
(Continued)

FOREIGN PATENT DOCUMENTS

DE 2302540 A1 7/1974
GB 2096777 A 10/1982
(Continued)

OTHER PUBLICATIONS

International Search Report and Written Opinion for International patent application No. PCT/US2016/068528, dated Apr. 26, 2017, 10 pages.

*Primary Examiner* — Nicole T Verley
(74) *Attorney, Agent, or Firm* — Steven M. Koehler; Westman, Champlin & Koehler, P.A.

(57) ABSTRACT

A wheel support having a transducer body includes a first support member having a spindle configured to support a wheel assembly for rotation about an axis of the spindle and a second support member. A plurality of transducer elements connects the first support member and the second support member. One of the first support member and the second support member are configured to be mounted to a vehicle and support the vehicle in part on the spindle.

22 Claims, 31 Drawing Sheets

(51) Int. Cl.
   *G01L 1/22*    (2006.01)
   *G01M 1/10*    (2006.01)
   *G01L 5/16*    (2006.01)
   *B60B 35/02*   (2006.01)

(52) U.S. Cl.
   CPC ............ *B60B 35/04* (2013.01); *G01L 1/2206* (2013.01); *G01L 1/2243* (2013.01); *G01L 5/161* (2013.01); *G01M 1/10* (2013.01); *B60Y 2400/305* (2013.01)

(56) References Cited

U.S. PATENT DOCUMENTS

| | | |
|---|---|---|
| 3,618,376 A | 11/1971 | Shull |
| 3,693,425 A | 9/1972 | Starita |
| 3,771,359 A | 11/1973 | Shoberg |
| 3,780,573 A | 12/1973 | Reus |
| 3,867,838 A | 2/1975 | Gerresheim |
| 3,939,704 A | 2/1976 | Zipin |
| 4,297,877 A | 11/1981 | Stahl |
| 4,448,083 A * | 5/1984 | Hayashi .............. G01L 5/161 73/862.042 |
| 4,483,203 A | 11/1984 | Capper |
| 4,488,441 A | 12/1984 | Ramming |
| 4,493,220 A | 1/1985 | Carignan |
| 4,499,759 A | 2/1985 | Hull |
| 4,550,617 A | 11/1985 | Fraignier |
| 4,573,360 A | 3/1986 | Amlani |
| 4,640,138 A | 2/1987 | Meyer |
| 4,672,855 A | 6/1987 | Schmieder |
| 4,748,844 A | 6/1988 | Yoshikawa |
| 4,763,531 A | 8/1988 | Dietrich |
| 4,821,582 A * | 4/1989 | Meyer .................. G01L 5/161 73/146 |
| 4,823,618 A | 4/1989 | Ramming |
| 5,313,828 A | 5/1994 | Kotzle |
| 5,315,882 A | 5/1994 | Meyer |
| 5,400,661 A | 3/1995 | Cook |
| 5,540,108 A | 7/1996 | Cook |
| 5,969,268 A | 10/1999 | Sommerfeld et al. |
| 6,439,063 B1 * | 8/2002 | Schnackenberg ....... G01L 5/161 73/862.041 |
| 6,575,031 B2 * | 6/2003 | Haeg ................. G01M 1/225 73/146 |
| 6,769,312 B2 * | 8/2004 | Meyer .................. G01L 1/2231 73/862.042 |
| 6,811,003 B2 * | 11/2004 | Novak ................ B60B 27/00 188/72.1 |
| 7,007,561 B1 * | 3/2006 | Otto ........................ B61K 9/08 73/862.631 |
| RE39,838 E * | 9/2007 | McDearmon ......... G01L 5/0019 73/795 |
| 7,726,205 B2 * | 6/2010 | Meyer .................. G01L 5/161 73/862.041 |
| 8,777,241 B1 * | 7/2014 | Hamernik ............ B60B 35/003 280/93.512 |
| 9,080,921 B2 * | 7/2015 | Okada ................ G01M 17/022 |
| 9,272,574 B2 * | 3/2016 | Ebert ................. B60B 27/0078 |
| 9,778,122 B2 * | 10/2017 | Meyer .................. G01L 5/168 |
| 2002/0118120 A1 | 8/2002 | Sommerfeld |

FOREIGN PATENT DOCUMENTS

| | | | |
|---|---|---|---|
| JP | 2012242273 A | 12/2012 | |
| WO | 99/04235 A1 | 1/1999 | |
| WO | WO-03019126 A1 * | 3/2003 | ........... B60G 17/019 |
| WO | WO-2004061323 A1 * | 7/2004 | ............. F16D 55/22 |

* cited by examiner

WHEEL SUPPORT HAVING A TRANSDUCER SENSOR BODY

CROSS-REFERENCE TO RELATED APPLICATION

The present application is based on and claims the benefit of U.S. provisional patent application Ser. No. 62/387,376, filed Dec. 23, 2015, the content of which is hereby incorporated by reference in its entirety.

BACKGROUND

The discussion below is merely provided for general background information and is not intended to be used as an aid in determining the scope of the claimed subject matter.

Various forms of transducers have been advanced for measuring force and moment data acting through a wheel assembly mounted to a spindle, such as a vehicle spindle. The data collected is useful in the design and manufacture of vehicles and/or vehicle systems. Typically, the transducer is secured to or is otherwise formed with a wheel rim that in turn supports a tire mounted thereto. The rim having the transducers is mounted conventionally to the spindle. Data is collected as the wheel assembly and transducer rotates upon the spindle. In view that the transducer is rotating, sensor output signals need to be processed so that forces and moments relative to a non-rotating coordinate system are obtained. Although current load cells are effective tools, an improved apparatus method for measuring forces and moments generated by a rotating wheel assembly with respect to one or more degrees of freedom is needed.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One general aspect includes a wheel support having a transducer body that includes a first support member having a spindle configured to support a wheel assembly for rotation about an axis of the spindle and a second support member. The wheel support also includes a plurality of transducer elements connecting the first support member and the second support member. The first support member and the second support member are configured to be mounted to a vehicle and support the vehicle in part on the spindle.

Implementations may include one or more of the following features. The first support member and the second support member are configured to be mounted to a vehicle and support the vehicle in part on the spindle. The first support member can be configured to support a brake caliper. The second support member can be configured to be secured to a vehicle frame, for example, when the wheel support is used on a spindle that turns to allow steering of the vehicle, the second support member can include a first portion configured to receive an upper ball joint and a second portion configured to receive a lower ball joint of the vehicle. To provide further rigidity, the second support member can include a rigid support structure connecting the first portion to the second portion. This rigid support structure can be disposed on a side of the first support member opposite the spindle, and/or behind the second support member having the spindle.

In one implementation the plurality of transducer elements include at least three; however, in a further implementation the plurality of transducer elements can include a first pair of transducer elements extending in opposite directions connecting the first portion to the first support member and a second pair of transducer elements extending in opposite directions connecting the second portion to the first support member. In another implementation, the transducer elements can be spaced apart from each other and disposed about the axis of the spindle, for example, at equal angular intervals about the axis of the spindle.

The transducer elements can take many forms where portions or surfaces used to provide an indication of force transmitted therethrough can be in shear and/or bending. As such, the transducer elements can be solid or hollow beams, rods, tubes or the like. In one advantageous embodiment comprise a tubular structure having a center axis. The axes of each of the pairs of transducer elements can be arranged to be parallel to each other, for example, aligned on a common axis. The first portion can include a first aperture having a first axis that is proximate or intersects with each of the axes of the first pair of transducer elements and where the second portion includes a second aperture having a second axis that is proximate or intersects with each of the axes of the second pair of transducer elements. Each of the tubular structures can have an internal cavity configured to receive cooling fluid. For example, at least one plug can be provided to seal the cavity. The plug can include a first port and a passageway extending into and opening within the cavity, and possibly a second port fluidly coupled to the cavity.

To prevent catastrophic failure where the first support member becomes disconnected from the second support member, the wheel support can include one or more spaced apart projections extending from one of the support members into aperture(s) in the other support member with clearance to allow the projection(s) to move without contacting an inner surface of an associated aperture. The projections contact a surface of the other support member if failure occurs so as to retain the first and second support members together and/or limit movement between the first and second support members.

Various implementations of the wheel support are possible. For instance, the wheel support can include a lever arm configured to receive a steering coupling of the vehicle. The wheel support can be configured to support a non-driven wheel assembly or a driven wheel assembly where, in the latter implementation, an aperture can be provided of size to allow a shaft to extend through to drive the wheel assembly.

DETAILED DESCRIPTION OF ILLUSTRATIVE EMBODIMENTS

A wheel support 10 includes a spindle 12 for rotationally supporting a rotor assembly 14 on a vehicle not shown. As used herein, "vehicle" is to not limited to an automobile, but rather, a thing having a spindle for supporting a wheel assembly for transporting people or goods, especially on land, such as but not limited to a car, truck, cart, trailer, plane or rail car.

The spindle 12 is coupled to a transducer body 16 of the wheel support 10. The transducer body 16 includes a plurality of transducer elements, typically at least three, herein illustrated as four transducer elements 20A, 20B, 20C and 20D that can include any form of sensing elements such as but not limited to strain gauges. More than four transducer elements can be provided if desired. The transducer body 16 having the sensing elements operably coupled to the transducer elements 20A-20D can thus provide forces and moments applied to the spindle 12, for instance, as the vehicle travels along a road. The wheel support 10 and in particular the spindle 12 is configured to support a non-driven rotor or wheel assembly.

Figure 2:
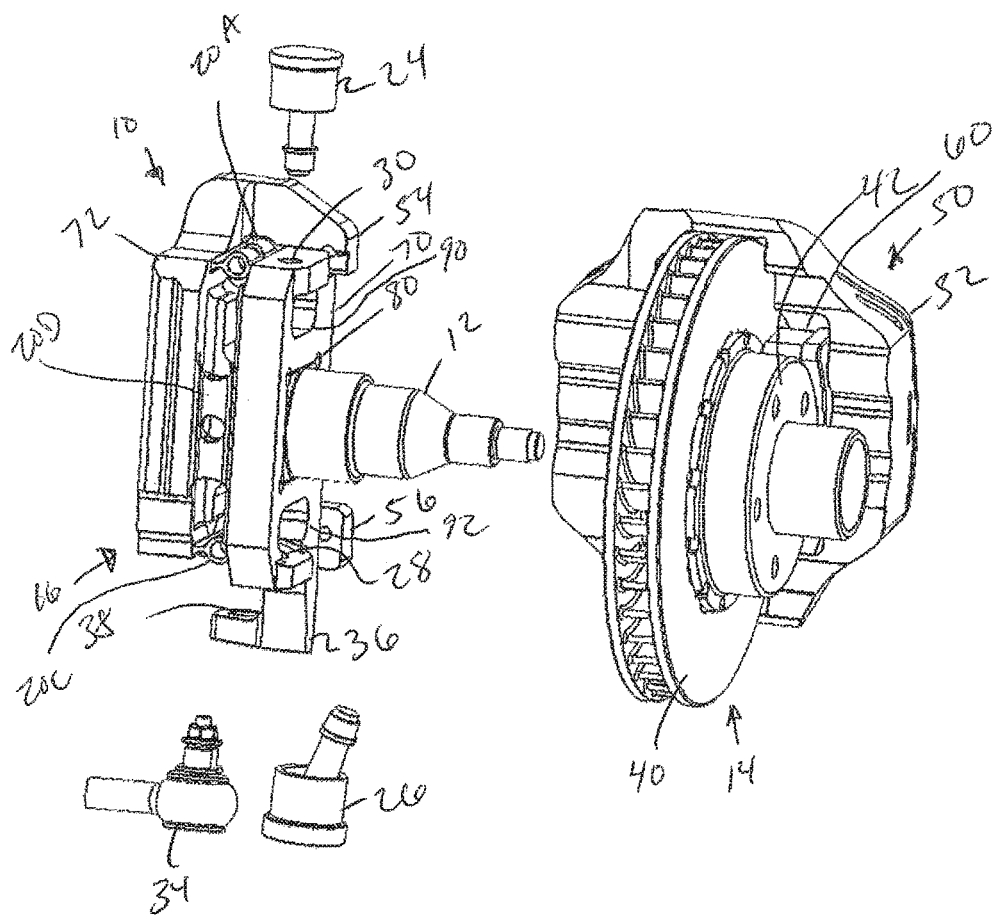
FIG. 2 is an exploded view of the system of FIG. 1.
Figure 3:
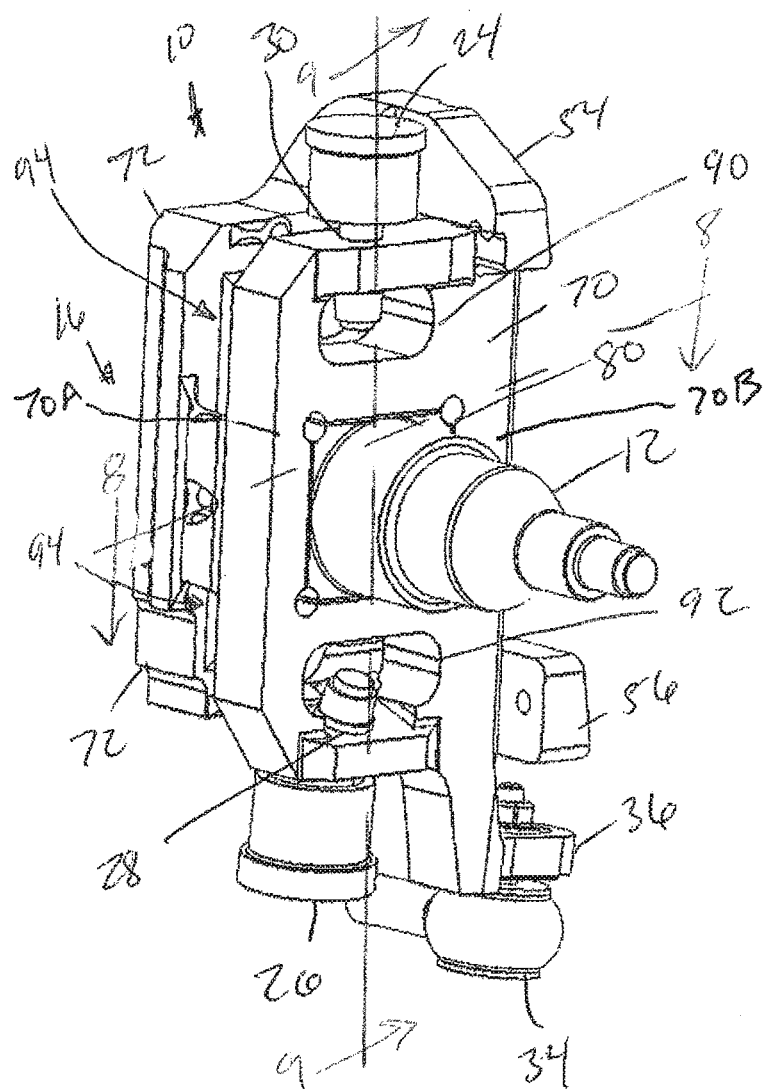
FIG. 3 is a perspective view of the transducer body of FIG. 1 with the rotor assembly removed.
Figure 4:
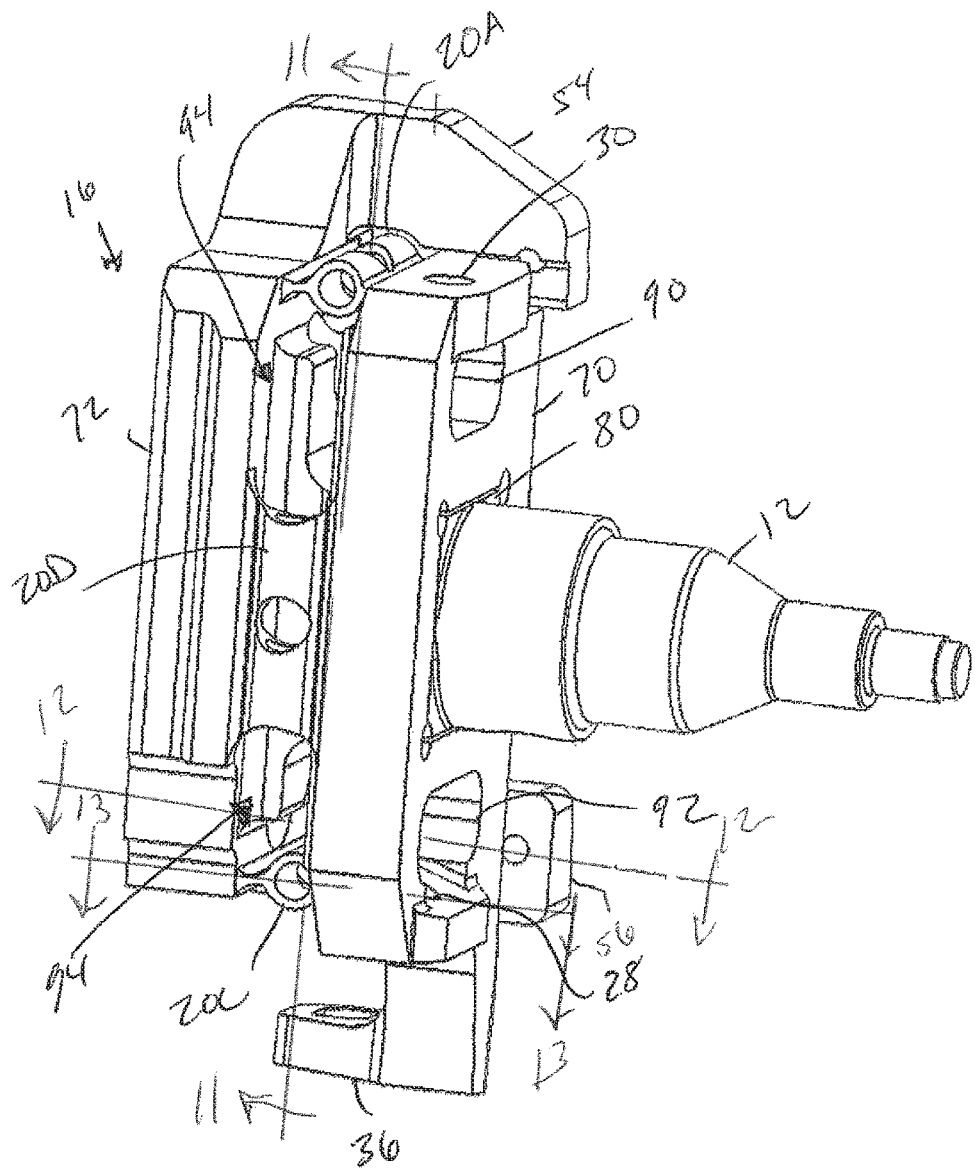
FIG. 4 is a perspective view of the transducer body of FIG. 1.

Referring to the exploded view of FIG. 2 and FIG. 3, the wheel support 10 is mounted to a vehicle frame, or a portion of a vehicle frame if used in a simulator or test machine (not shown) with an upper ball joint indicated at 24 and a lower ball joint indicated at 26. The lower ball joint 26 extends through an aperture 28 in the wheel support 10, while the upper ball joint 24 extends through an aperture 30 in the wheel support 10. In the embodiment illustrated, the wheel support 10 is located on a corner of the vehicle that enables the wheel assembly to be steered as such, a tie-rod coupling 34 can be mounted to a lever arm 36 of the wheel support 10 through an aperture 38 provided in the lever arm 36.

Figure 10:
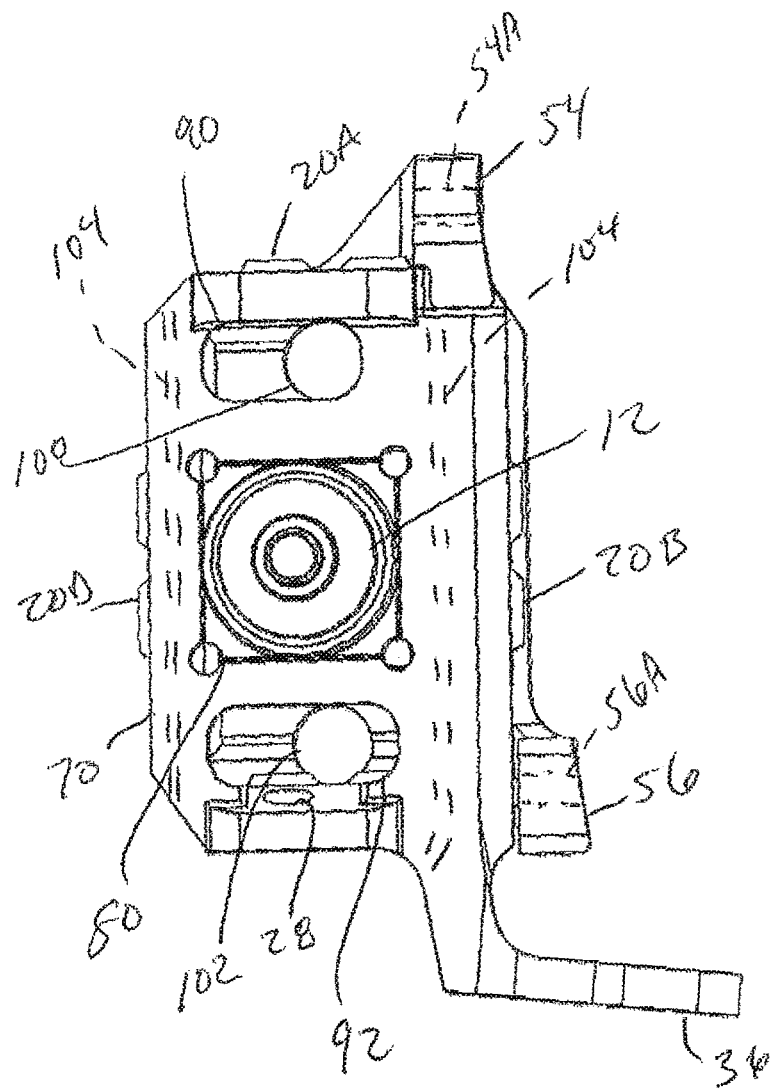
FIG. 10 is a front elevational view of the transducer body of FIG. 1.

Generally, the rotor assembly 14 includes a rotor disc 40 secured to a hub assembly 42 that is mounted on the spindle 12 in a conventional manner. A brake assembly 50 includes a caliper assembly 52 that can be mounted to the wheel support 10 using caliper support flanges 54 and 56 on the wheel support 10, each having associated mounting apertures 54A and 56A (FIG. 10). The brake caliper assembly 50 includes pads, one of which is illustrated at 60, that engage opposite sides of the rotor disc 40.

Generally, the transducer body 16 includes first and second support members 70 and 72 wherein the transducer elements 20A-20D provide the mechanical couplings between the support members 70 and 72. In this embodiment, generally the transducer elements are disposed about an axis of the spindle. In a further embodiment, the transducer elements are disposed about the axis of the spindle 12 at equal angular intervals. With this embodiment, by example, where four transducer elements 20A-20D are provided, the transducer elements are disposed at 90 degree intervals. Generally, two or more transducer elements can be provided, and disposed preferably at equal angular intervals about the axis of the spindle 12.

Figure 8:
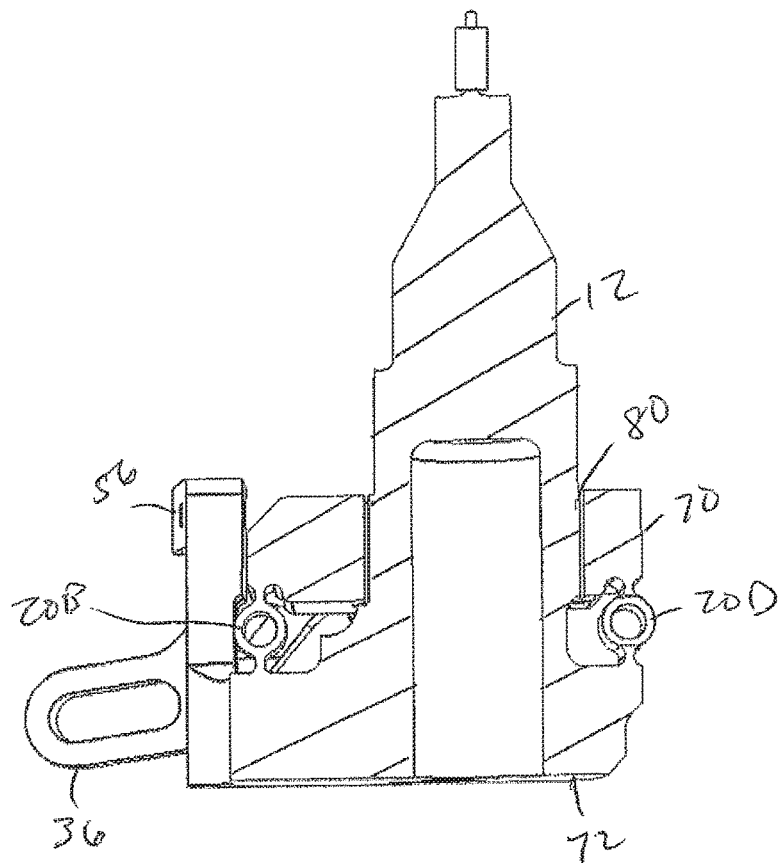
FIG. 8 is a sectional view of the transducer body taken along lines 8-8 of FIG. 3 with parts removed.
Figure 9:
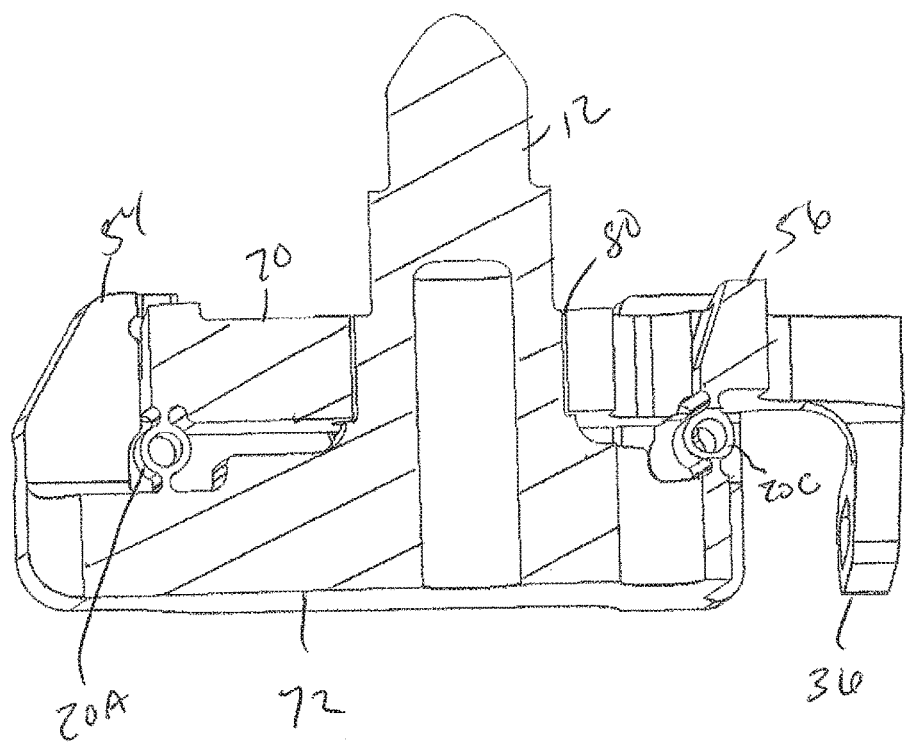
FIG. 9 is a sectional view of the transducer body taken along lines 9-9 of FIG. 3 with parts removed.

As illustrated in FIG. 3, the upper and lower ball joints 24 and 26, respectively, are coupled to the support member 70 while the spindle 12 extends through an aperture 80 formed in the support member 70. The spindle 12 is fixedly secured to the support member 72, and in a preferred embodiment, being integrally formed therewith as a single unitary body. FIGS. 8 and 9 are sectional views illustrating how the spindle 12 is fixedly secured to the support member 72 and extends through the aperture 80 in support member 70. The support member 70 includes a rigid support structure that connects the portion to which the upper ball joint 24 is mounted and the portion to which the lower ball joint 26 is mounted, i.e. a center portion having the aperture 80.

In one embodiment, the aperture 80 includes flat surfaces forming a polygon such as a square as illustrated; however, this should not be considered limiting in that other polygonal shaped apertures can be used. Using an aperture 80 in the form of a polygon that has flat sides is particularly advantageous in that in the event that catastrophic failure occurs with one or more of the transducer elements 20A-20D, the complementary flat sides of the spindle 12 and the flat inner surfaces of the aperture 80 will engage each other so as to lock up and otherwise inhibit rotation of the spindle 12. With the support member 70 mounted to the vehicle using ball joints 24 and 26, and the spindle 12 fixedly secured to support member 72, the spindle 12 and thus the wheel assembly, not shown, will stay on the vehicle.

Figure 5:
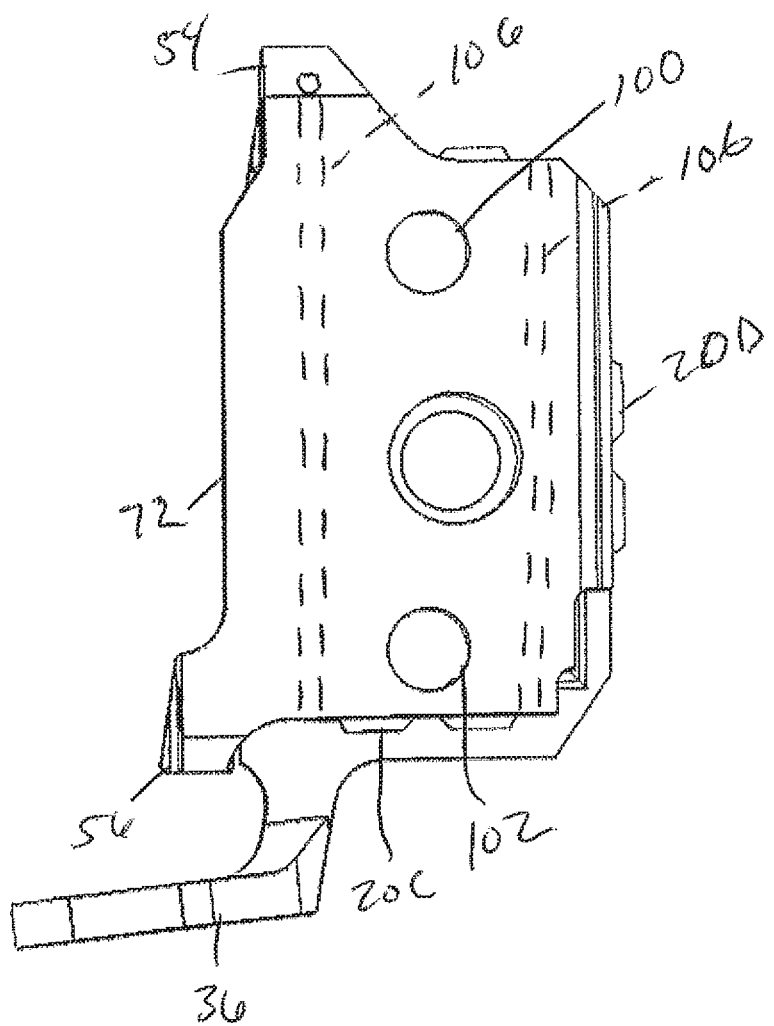
FIG. 5 is a rearview of the transducer body of FIG. 1.
Figure 6:
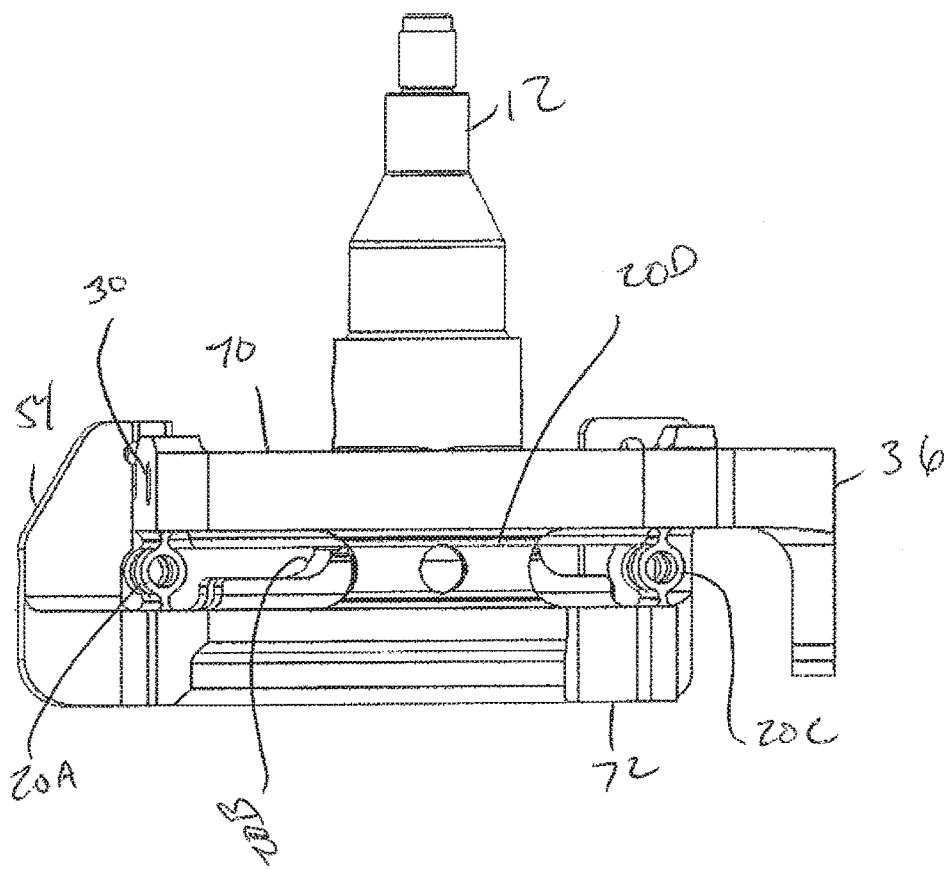
FIG. 6 is a side elevational view of the transducer body of FIG. 1.
Figure 7:
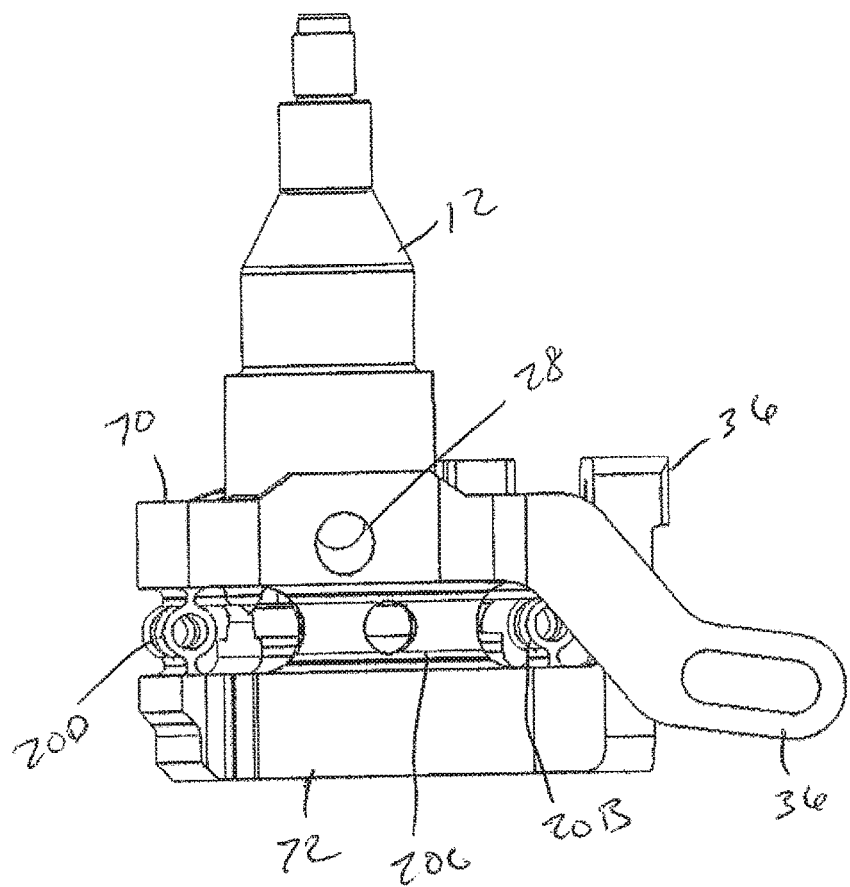
FIG. 7 is a bottom view of the transducer body of FIG. 1.

In order to provide cooling for the brake assembly 50 and in particular the rotor disc 40, the support member 70 includes an upper aperture 90 and a lower aperture 92 that open toward a rear surface of the rotor disc 40. Air circulation through the apertures 90 and 92 can be provided through the circumferential openings 94 formed between the transducer elements 20A-20D. If desired, one or more apertures 100 and 102 as illustrated in FIG. 5 can be provided in support member 70 and aligned with apertures 90 and 92, respectively. Ducts, not shown, can direct air into the apertures 100 and 102. If needed or if desired, cooling passages can be provided in support members 70 and 72. Cooling passages 104 and 106 are schematically illustrated in FIGS. 5 and 10. Passages 104 and 106 are merely exemplary in that the size and location can be varied as desired depending upon the amount of cooling needed.

Figure 11:
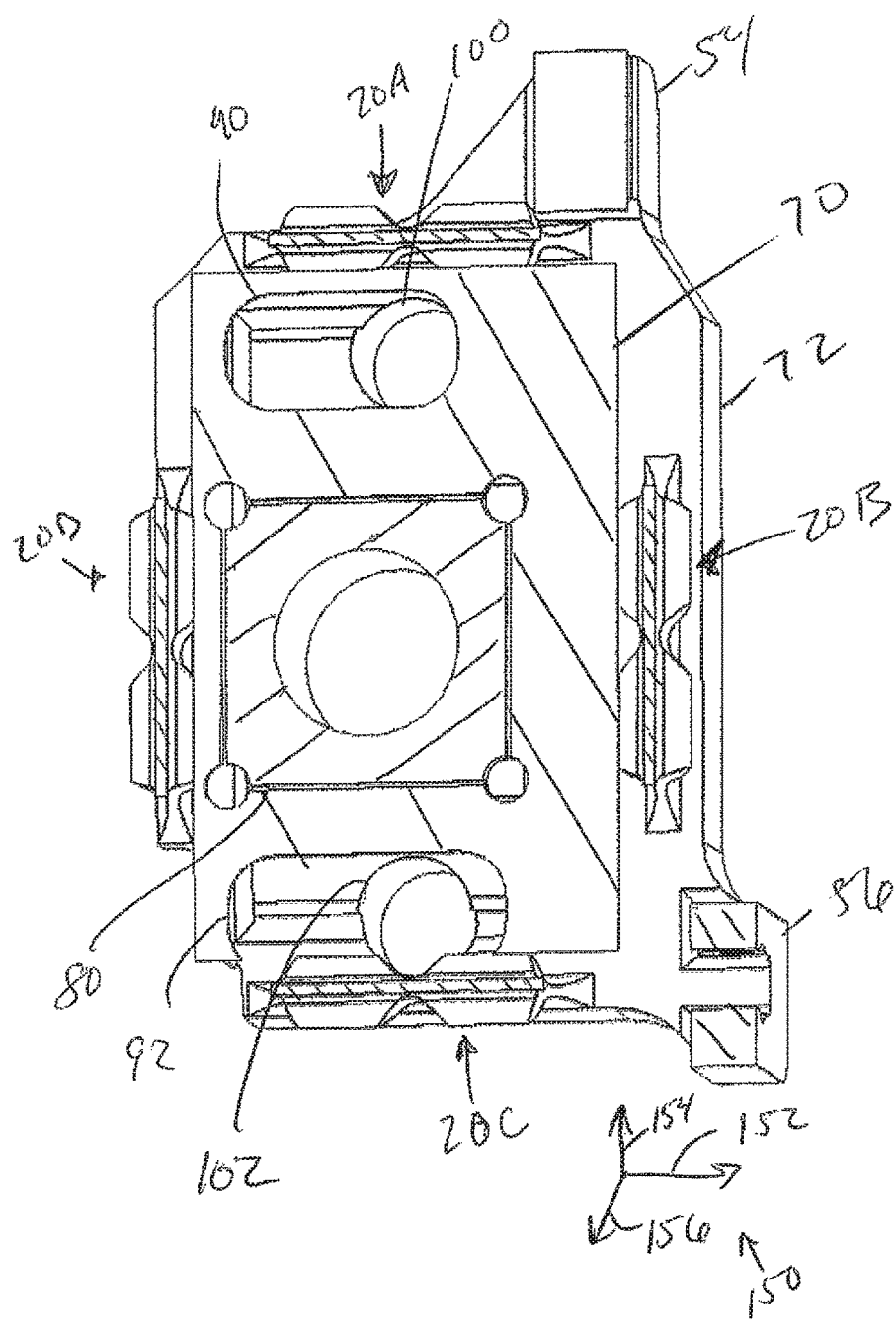
FIG. 11 is a sectional view of the transducer body taken along lines 11-11 of FIG. 4.
Figure 12:
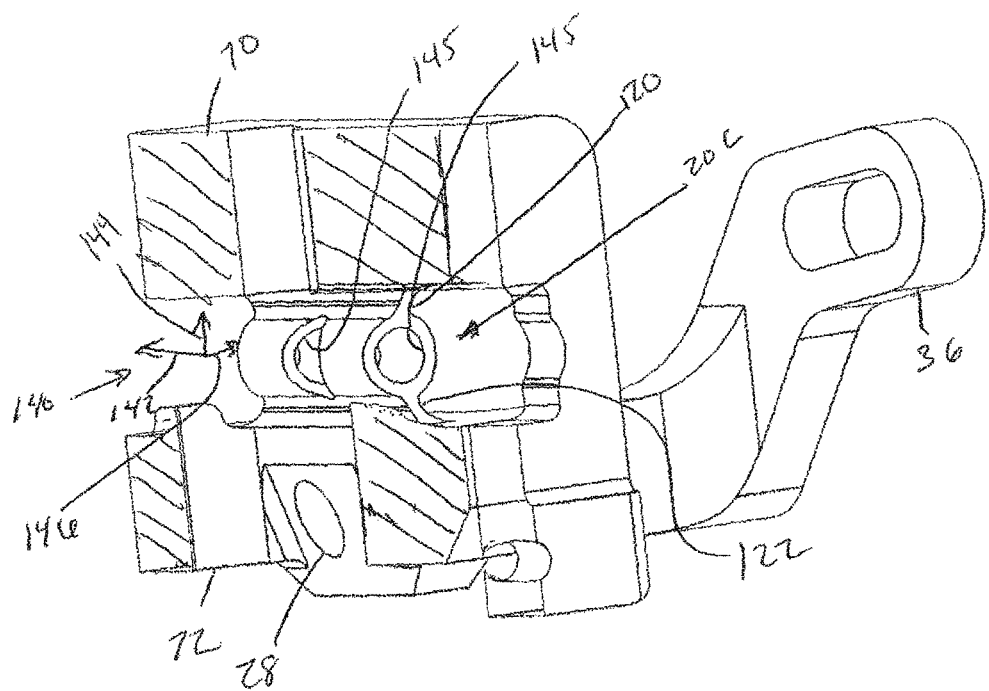
FIG. 12 is a sectional view of the transducer body taken along lines 12-12 of FIG. 4.
Figure 13:
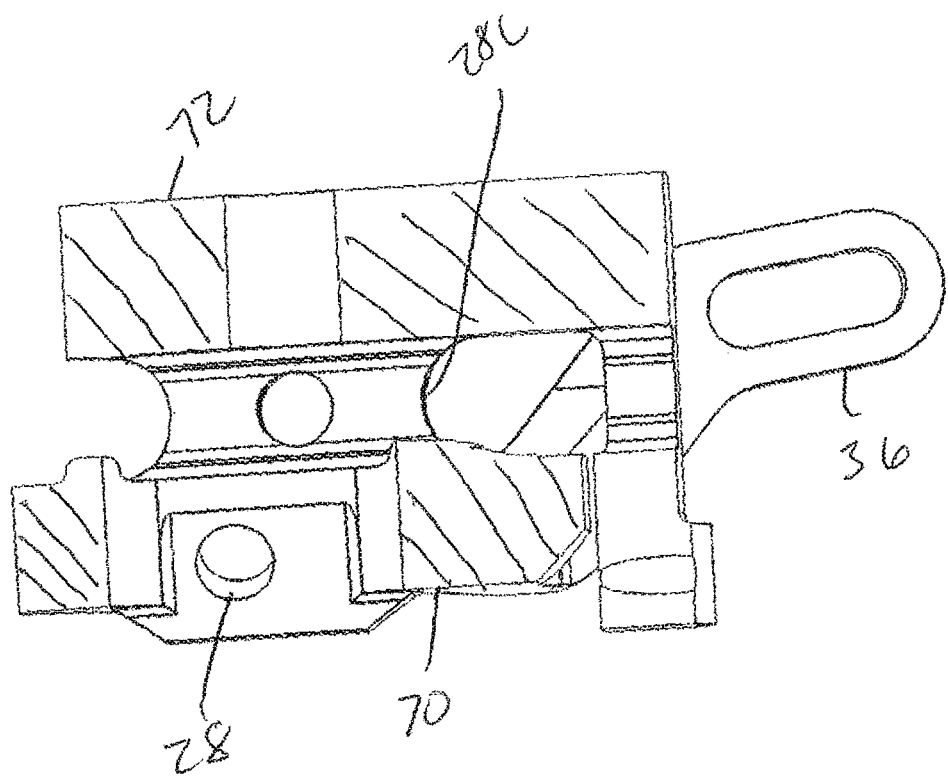
FIG. 13 is a sectional view of the transducer body taken along lines 13-13 of FIG. 4.

In the embodiment illustrated four transducer elements 20A-20D are provided and couple support members 70 and 72 together as illustrated in FIG. 11. It should be noted that although four transducer elements are illustrated, three or more transducer elements can be used if desired. In a particularly advantageous embodiment, the transducer elements 20A-20D are constructed in a manner as described in application "TRANSDUCER SENSOR BODY" filed on even date herewith with the US Patent Office and assigned Ser. No. 15/389,801 and which was also described in U.S. Provisional Patent Application 62/387,378, filed Dec. 23, 2015, both of which are incorporated herein in their entirety. The transducer elements described in the co-pending application are particularly advantageous as they form a very compact design of the transducer body 16. Each of the transducer elements 20A-20D include flexures 120 and 122 as illustrated in FIG. 12 with respect to transducer elements 20D. An orthogonal coordinate system is illustrated in FIG. 12 at 140. The transducer element 20C measures longitudinal forces parallel to axis 142, which is oriented so as to coincide with axes of bores 145 of the transducer elements 20C, and axial forces parallel to axis 144. The transducer element 20C is compliant for translation or transverse forces parallel to axis 146.

Referring back to FIG. 11, a global orthogonal coordinate system 150 is illustrated for the transducer body 16 where a portion of support member 70 has been removed and is now shown with section lines. The transducer elements 20A-20D operate in opposed pairs. In particular, due to the flexures coupling each of the transducer elements 20A-20D to the support members 70 and 72, for a longitudinal force parallel to axis 152, this force will be reacted between support members 70 and 72 through transducer elements 20A and 20C (in shear), while transducer elements 20B and 20D are compliant for forces parallel to axis 152. Similarly, for forces parallel to axis 154 transducer elements 20B and 20D will react the forces between support members 70 and 72, while transducer elements 20A and 20C are compliant. For forces parallel to axis 156, which would also be parallel to the longitudinal axis of spindle 12, each of the transducer elements 20A-20D would experience compression or tension depending upon the direction of the force. Hence, for forces parallel to axis 156, all four transducer elements 20A-20D are active. In a similar fashion, moments about axis 152 are sensed by compression and tension forces of transducer elements 20A and 20C, while moments about axis 154 are sensed by transducer elements 20B and 20D. Finally, for a moment about axis 156 and thus a moment about an axis of the spindle 12, all of the transducer elements 20A-20D would be active.

It should be noted that a moment about axis 156 can be primarily from use of the brake caliper 52 upon the rotor disc 40. To measure this moment the caliper 52 is secured to support member 72 that includes the spindle 12. Hence, pressure applied to the rotor disc 40 from the caliper 52 causes strain in the transducer elements 20A-20D. If the caliper 52 was instead mounted to the support member 70, which does not carry the spindle 12, the transducer elements 20A-20D would not carry the moment or torque occurring while braking. For similar reasons, the steering lever arm 36 is carried by the support member 72 so that the moment about axis 154 can be carried by transducer elements 20B and 20D.

FIGS. 14-22 illustrate a wheel support 210 for use on a driven axle such as but not limited to a rear axle. A transducer body 216 is used to support a rotor assembly 214 for a tire and wheel assembly, not shown, driven by an axle 213. It should be noted that the embodiment illustrated in FIGS. 14-22 have elements similar to the embodiment of FIGS. 1-13. Components having similar function in the embodiment of FIGS. 14-22 have reference numbers increased by 200.

Figure 14:
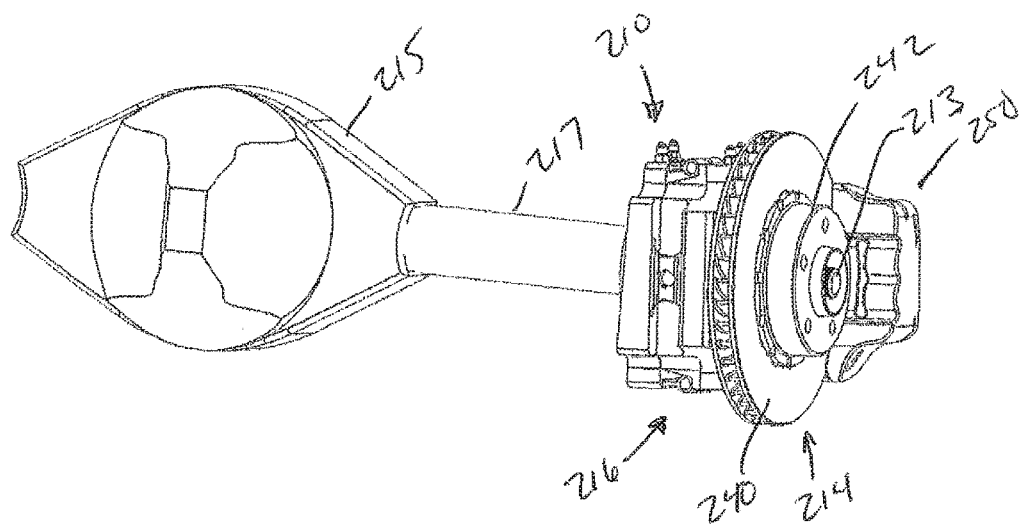
FIG. 14 is a perspective view of second embodiment of the transducer body mounted to an axle assembly and including a rotor assembly.
Figure 15:
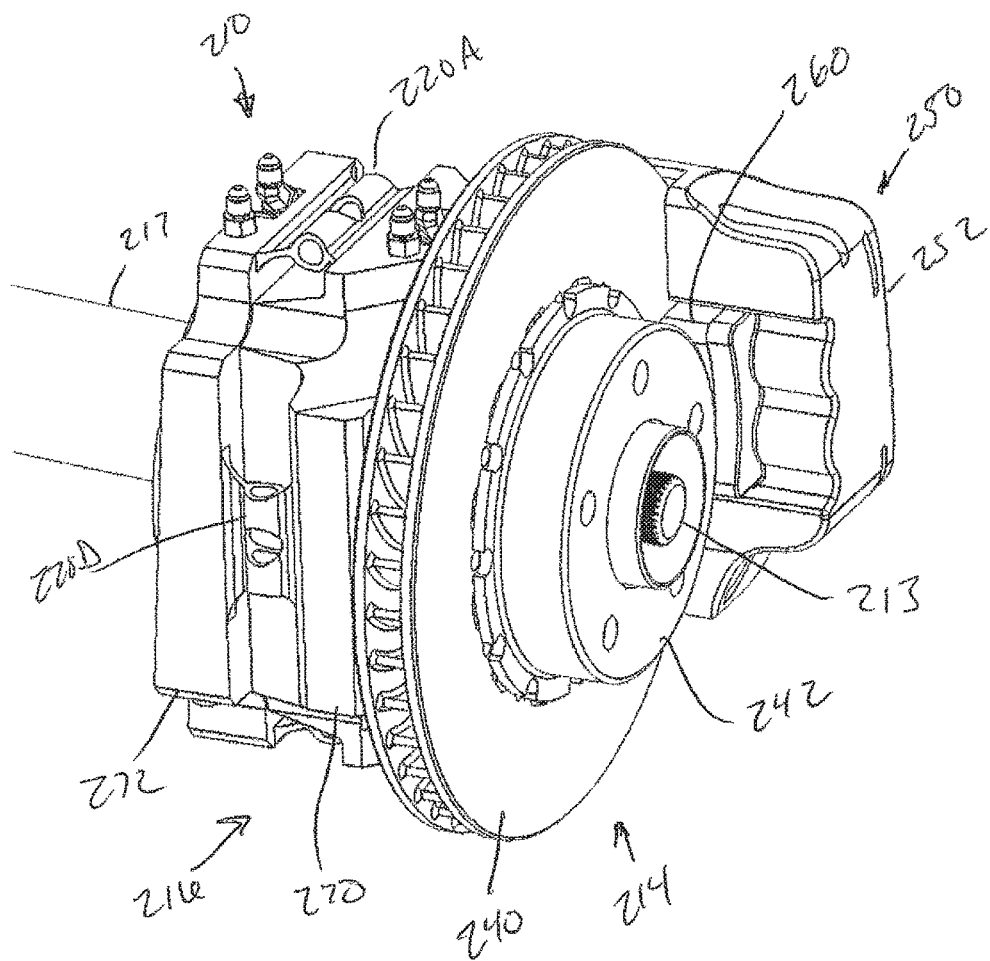
FIG. 15 is a perspective view of the transducer body of FIG. 14 and the rotor assembly.

As illustrated in FIG. 14, the axle 213 extends from a differential 215 through an axle tube 217. The end of the axle 213 extends into a rotor hub 242 that is fixedly secured to a rotor disc 240. A caliper brake assembly 250 includes a caliper 252 to selectively engage pads on opposite sides of the rotor disc 240, one of the pads being illustrated at 260.

Figure 16:
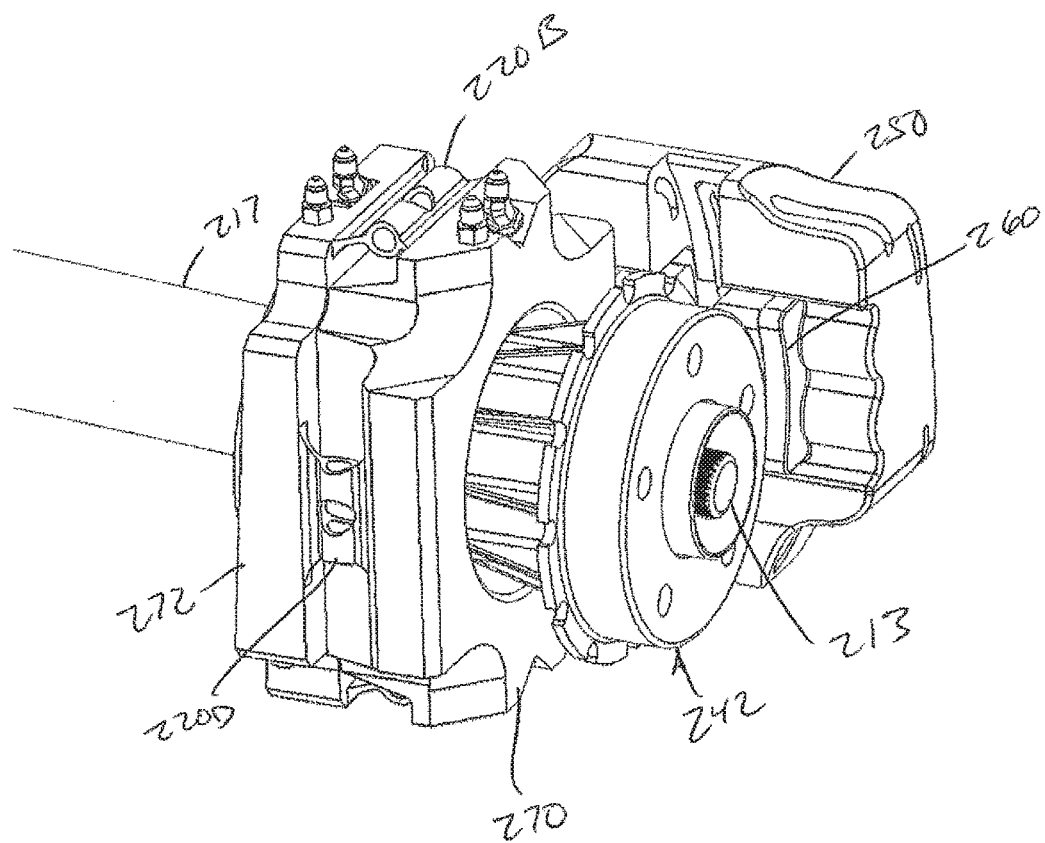
FIG. 16 is a perspective view of the transducer body of FIG. 14 with portions of the rotor assembly removed.
Figure 17:
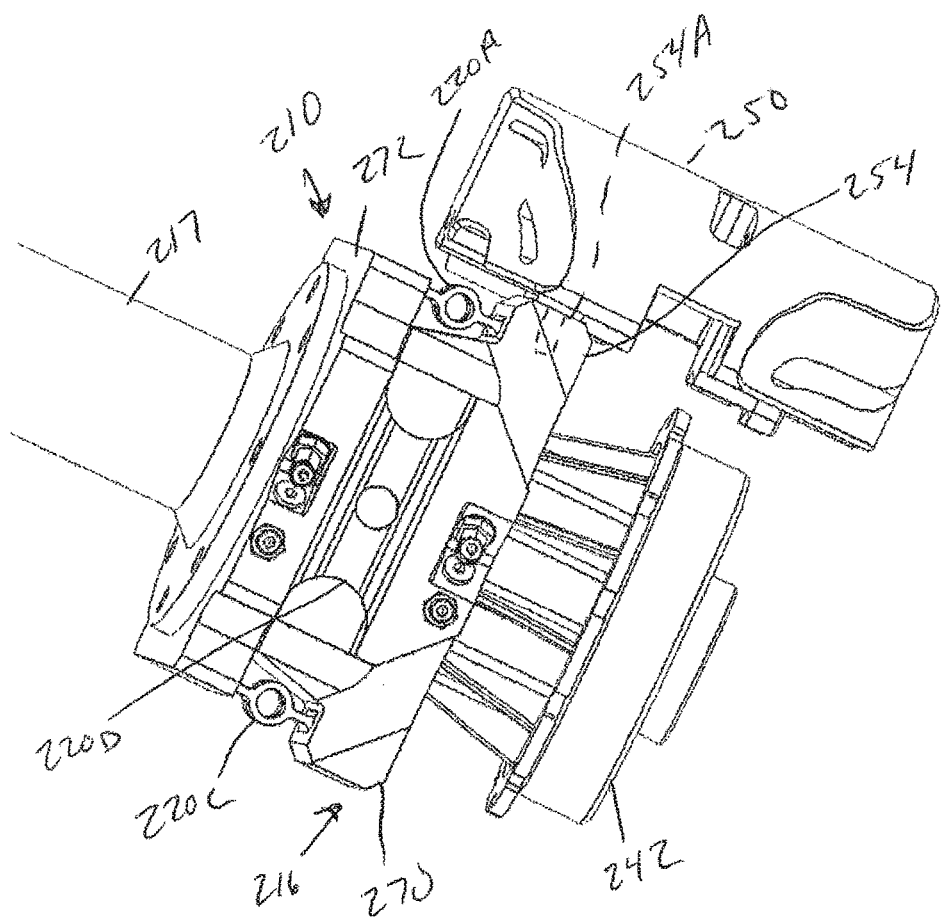
FIG. 17 is a top view of the transducer body of FIG. 14 with portions of the rotor assembly removed.

In FIG. 16, the rotor disc 240 has been removed leaving the rotor hub 242 and the caliper assembly 250. As illustrated in FIG. 17, the caliper brake assembly 250 is secured to the transducer body 216. The transducer body 216, like the embodiment of FIGS. 1-13 includes a first support member 270 and a second support member 272. The support members 270 and 272 are joined together by transducer elements 220A-220D, which are similar to transducer elements 20A-20D described above. Similarly, the transducer elements are disposed about an axis of the spindle. In a further embodiment, the transducer elements are disposed about the axis of the spindle 212 at equal angular intervals. With this embodiment, by example, where four transducer elements 220A-220D are provided, the transducer elements are disposed at 90 degree intervals. Generally, two or more transducer elements can be provided, and disposed preferably at equal angular intervals about the axis of the spindle 212.

Figure 18:
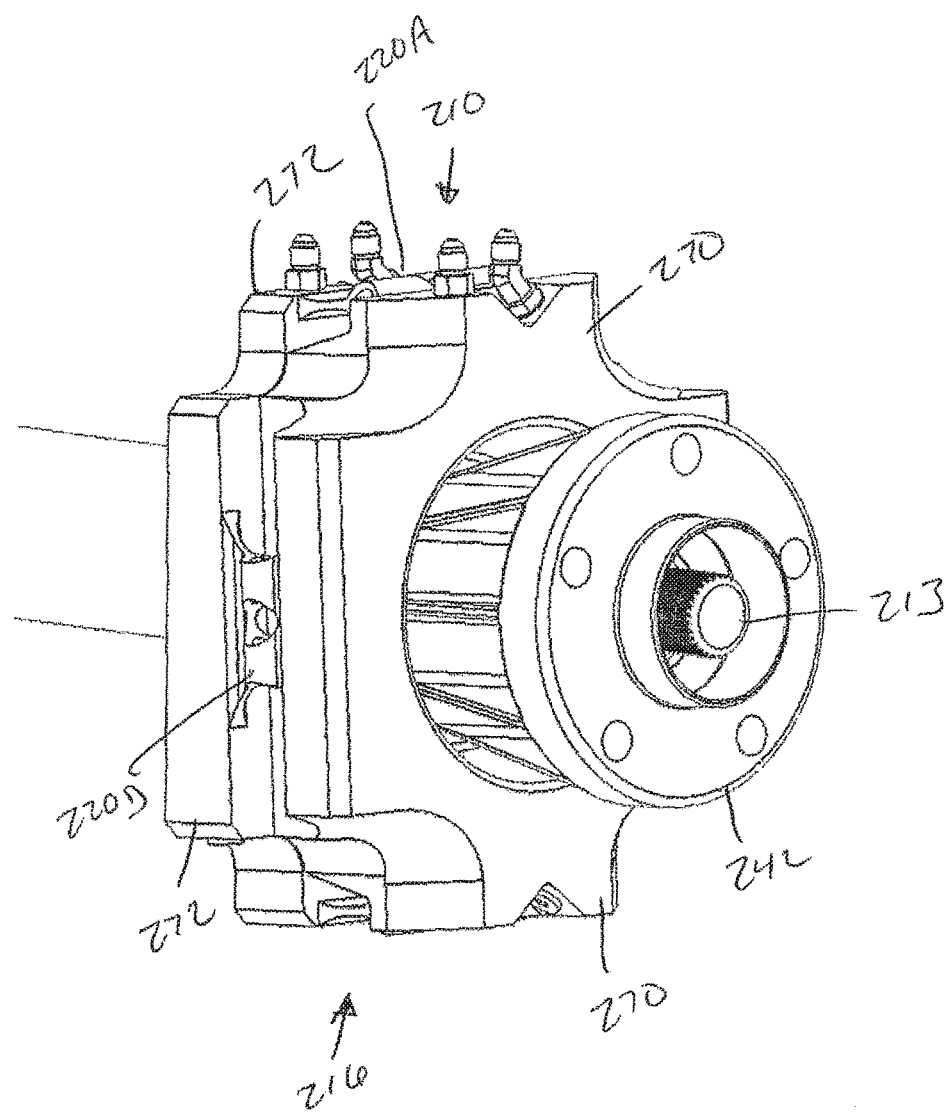
FIG. 18 is a perspective view of the transducer body of FIG. 14 with the rotor assembly removed.

The caliper brake assembly 250 is secured to a caliper support flange 254 having suitable mounting apertures 254A on support member 270, while the axle tube 217 is fixedly secured to support member 272. In FIG. 18, the caliper assembly 250 has been removed, while in FIG. 19, the rotor hub 242 has been removed.

Figure 19:
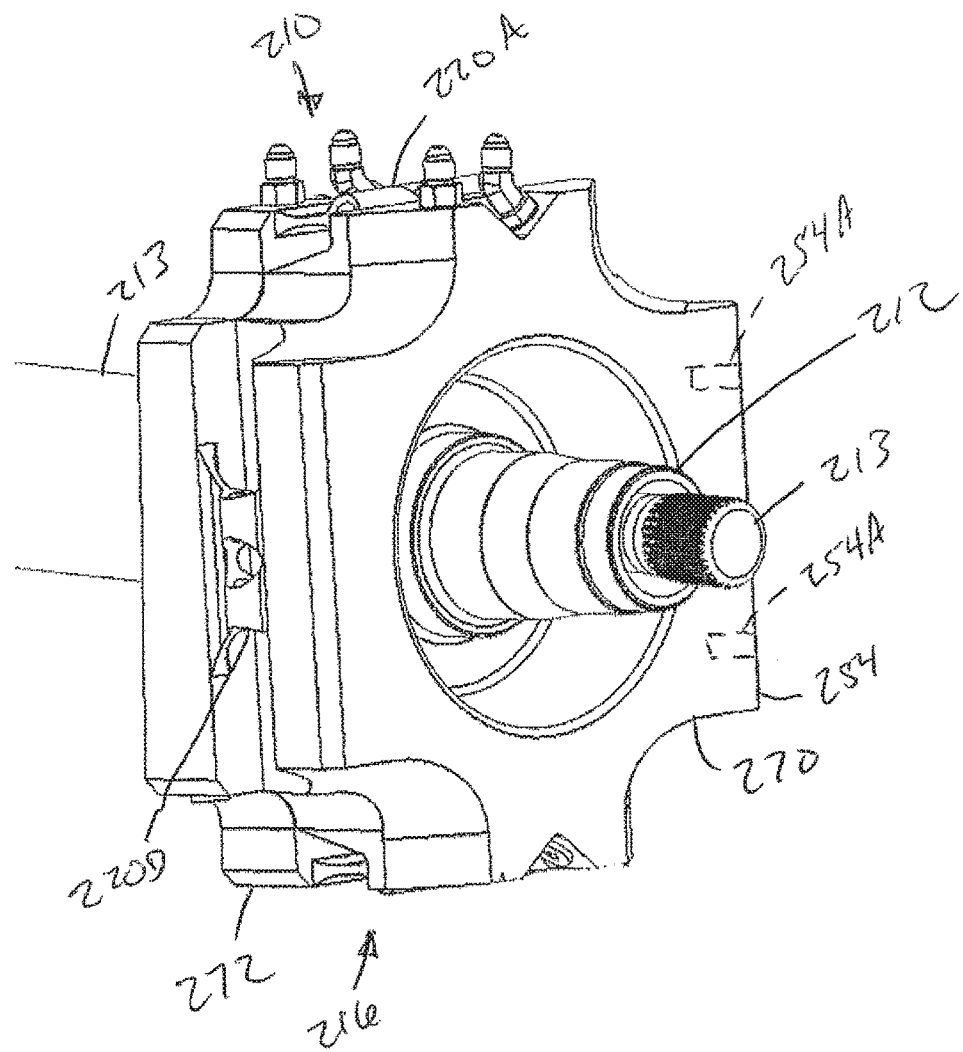
FIG. 19 is a perspective view of the transducer body of FIG. 14 with the rotor assembly removed
Figure 20:
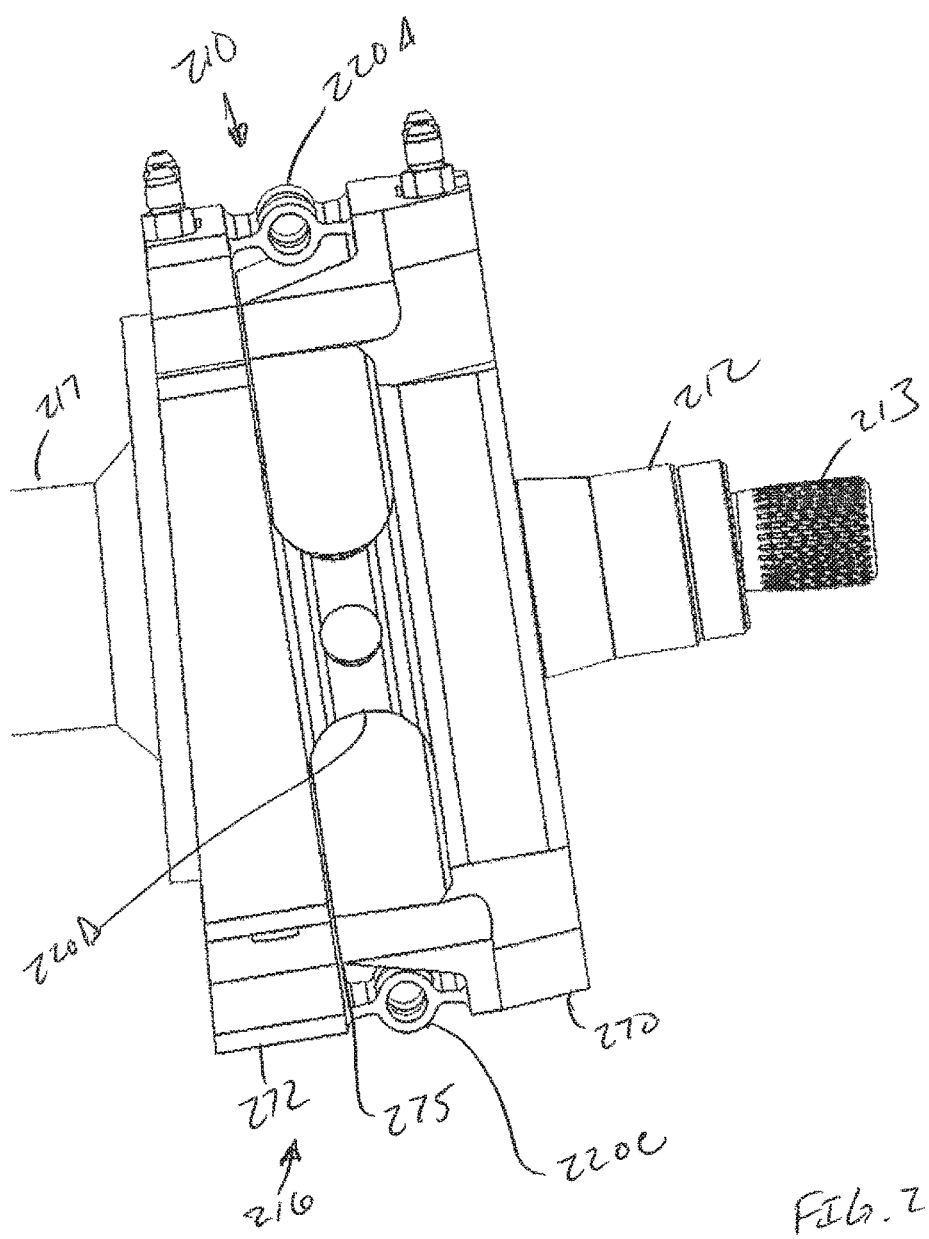
FIG. 20 is a side elevational view of the transducer body of FIG. 14 with portions of the rotor assembly removed.

In FIG. 19, a spindle or rotor hub support 212 is fixedly secured to support member 270. Support members 270 and 272 are separated from each other by a gap indicated at 275 in FIG. 20. Unlike the previous embodiment where the spindle 12 is mounted to the support member 272, the spindle or rotor hub support 212 is mounted to the support member 270. As indicated above, transducer elements 220A-220D secure the support members 270 and 272 together allowing relative motion therebetween. At least a plurality of transducer elements are provided, typically at least three but exemplified herein illustrated using four elements. More than four transducer elements can be provided if desired.

Figure 21:
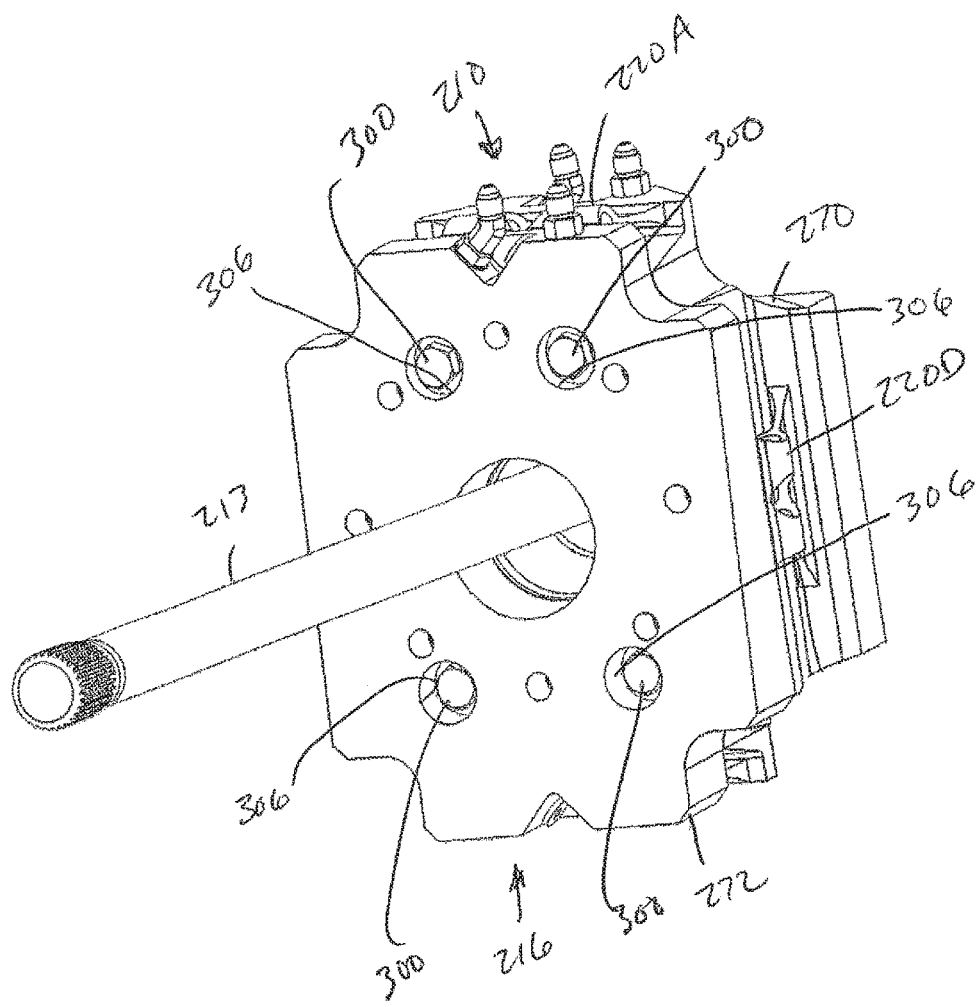
FIG. 21 is a rear perspective view of the transducer body of FIG. 14 and the axle shaft.
Figure 22:
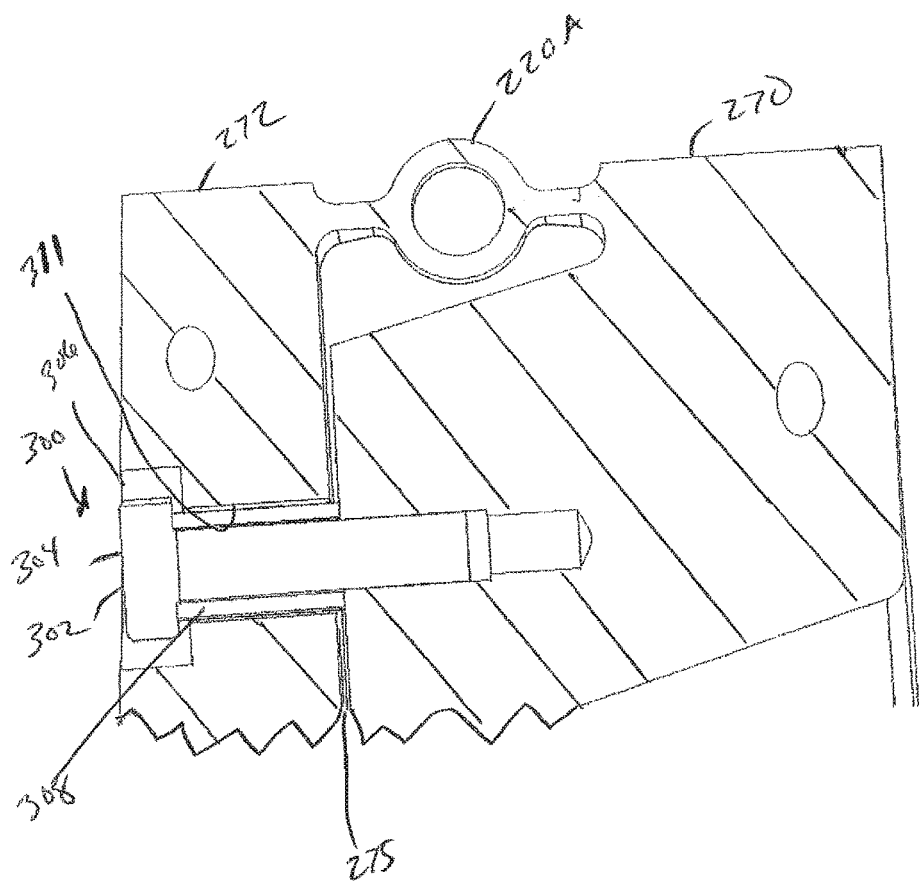
FIG. 22 is an enlarged sectional view of a portion of the transducer body of FIG. 14.
Figure 23:
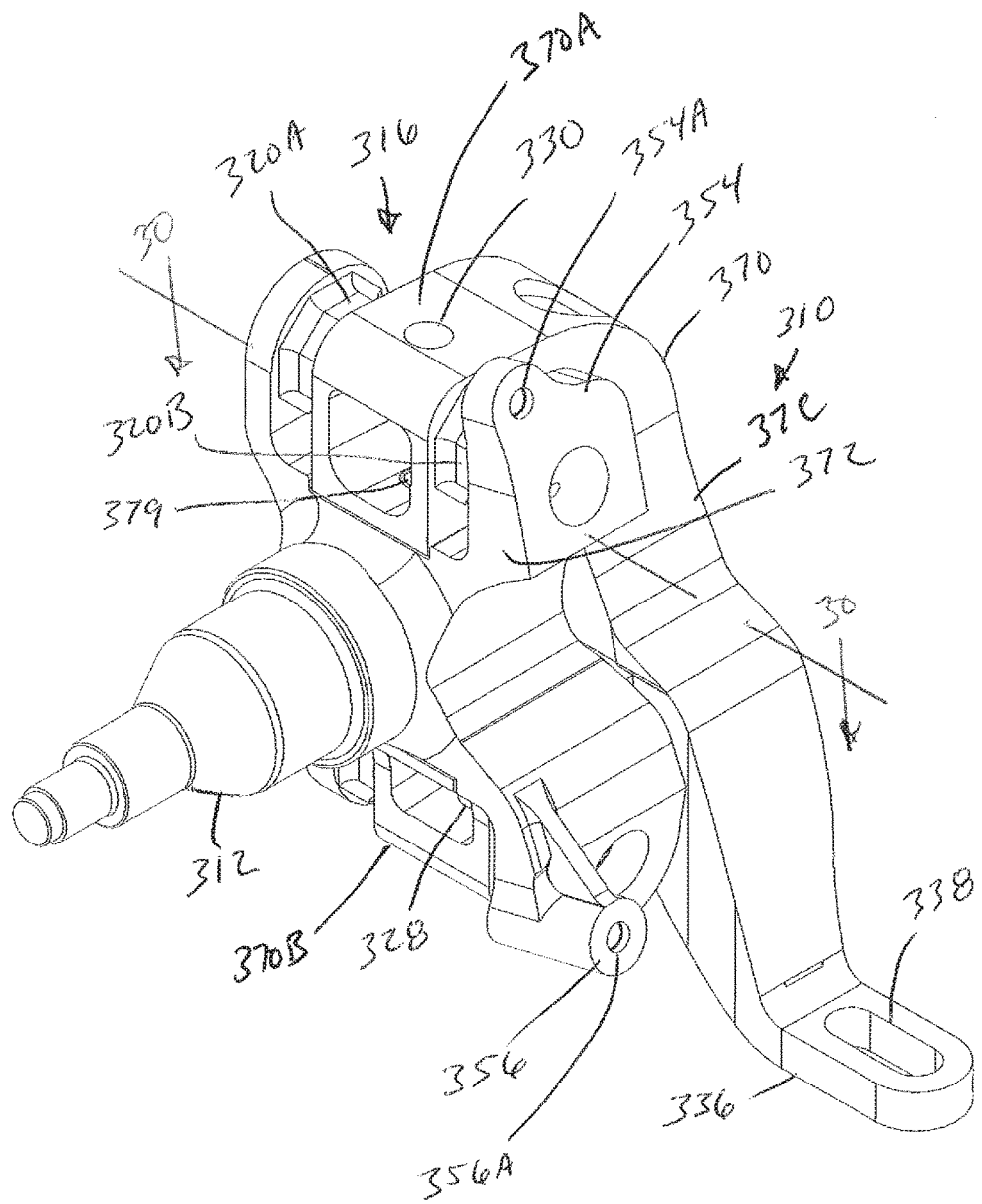
FIG. 23 is a perspective view of a third embodiment of transducer body.
Figure 24:
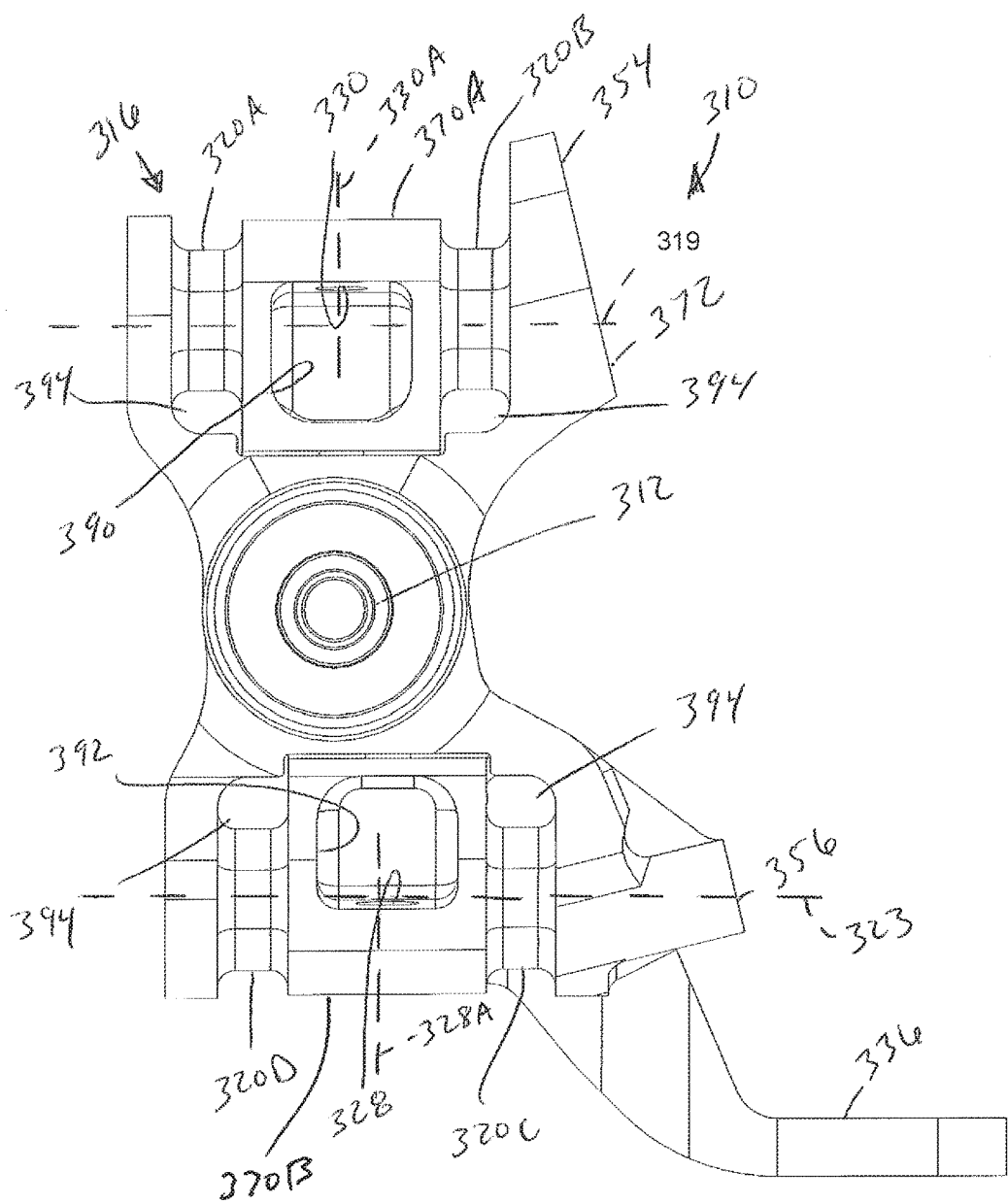
FIG. 24 is a front elevational view of the transducer body of FIG. 23.
Figure 25:
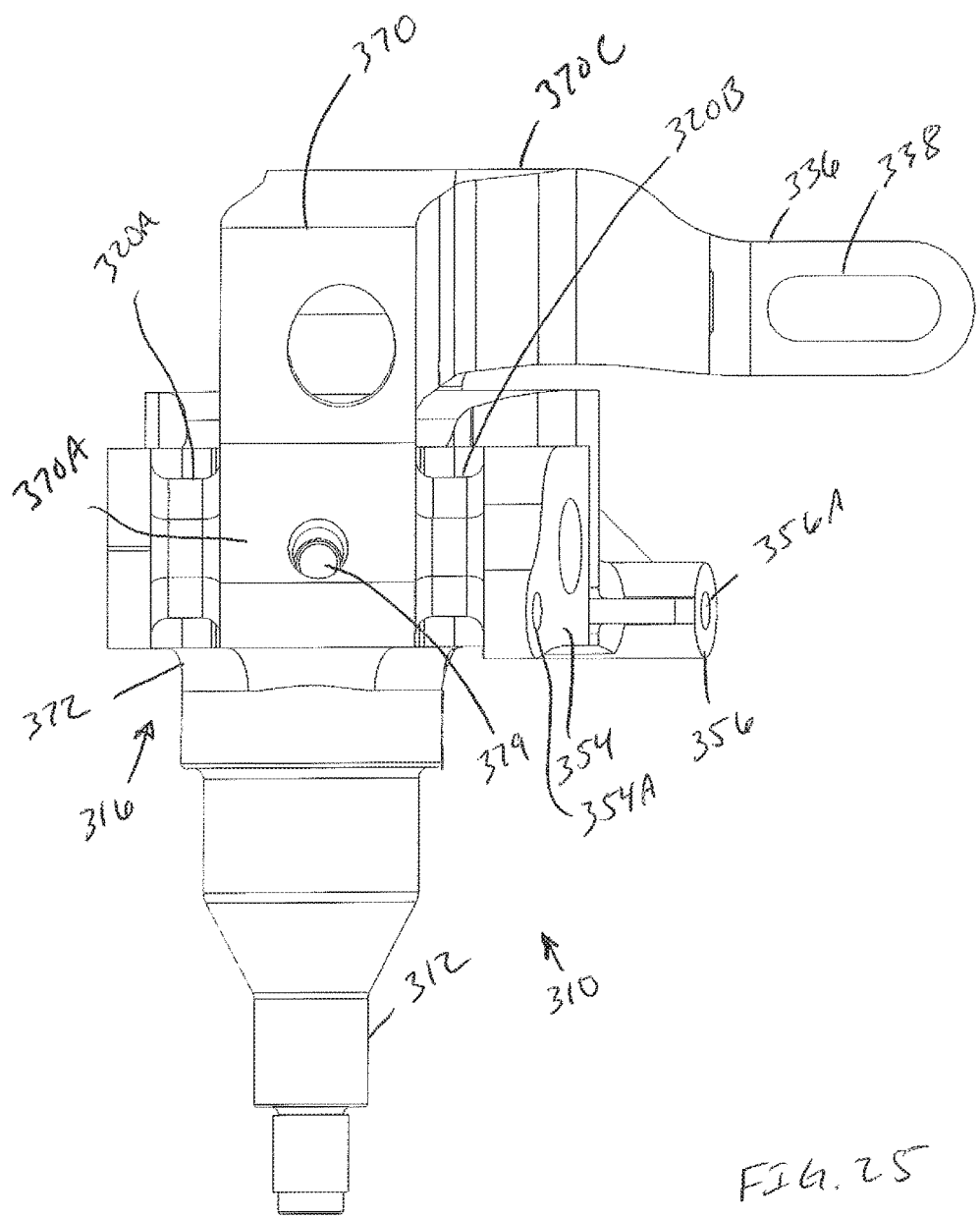
FIG. 25 is a top view of the transducer body of FIG. 23.
Figure 26:
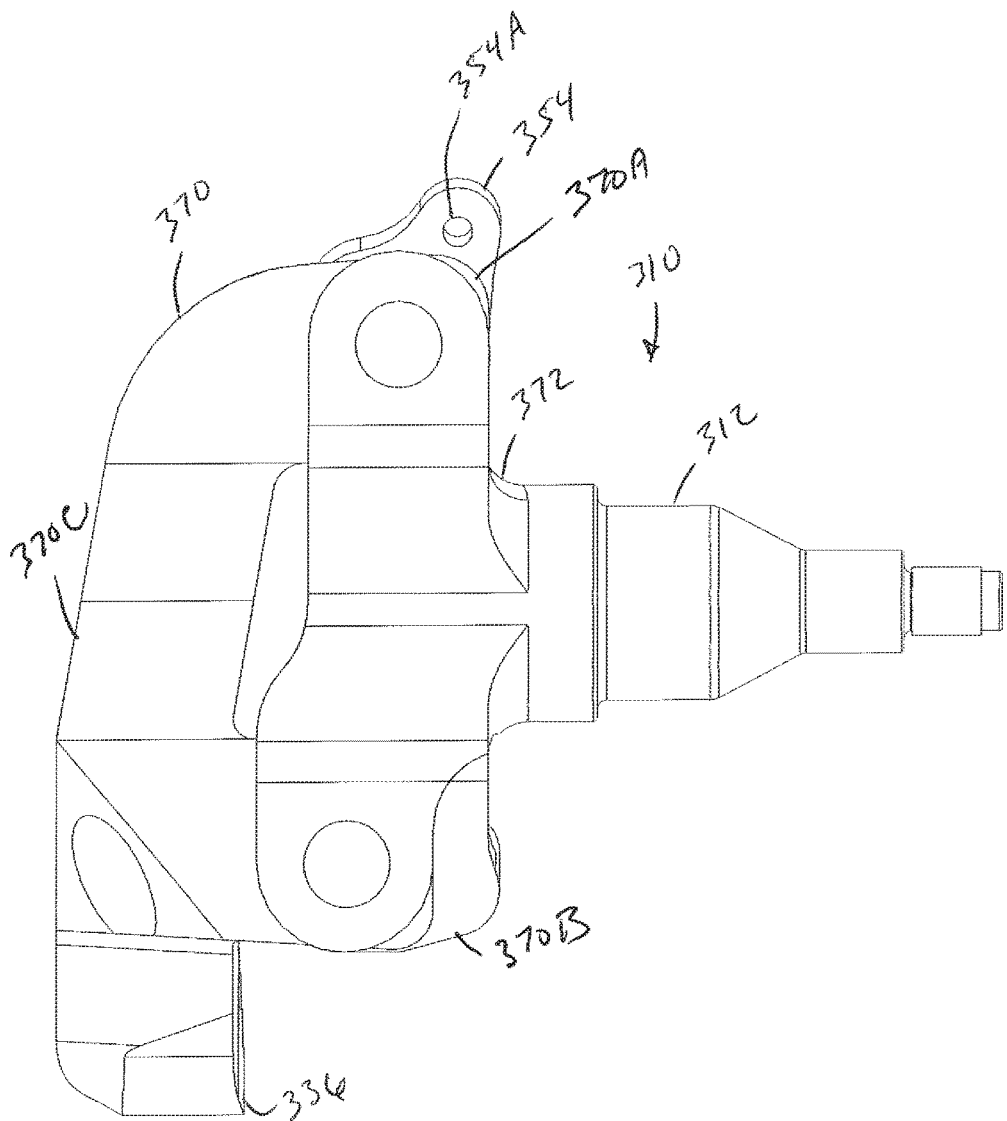
FIG. 26 is a left side elevational view of the transducer body of FIG. 23.
Figure 27:
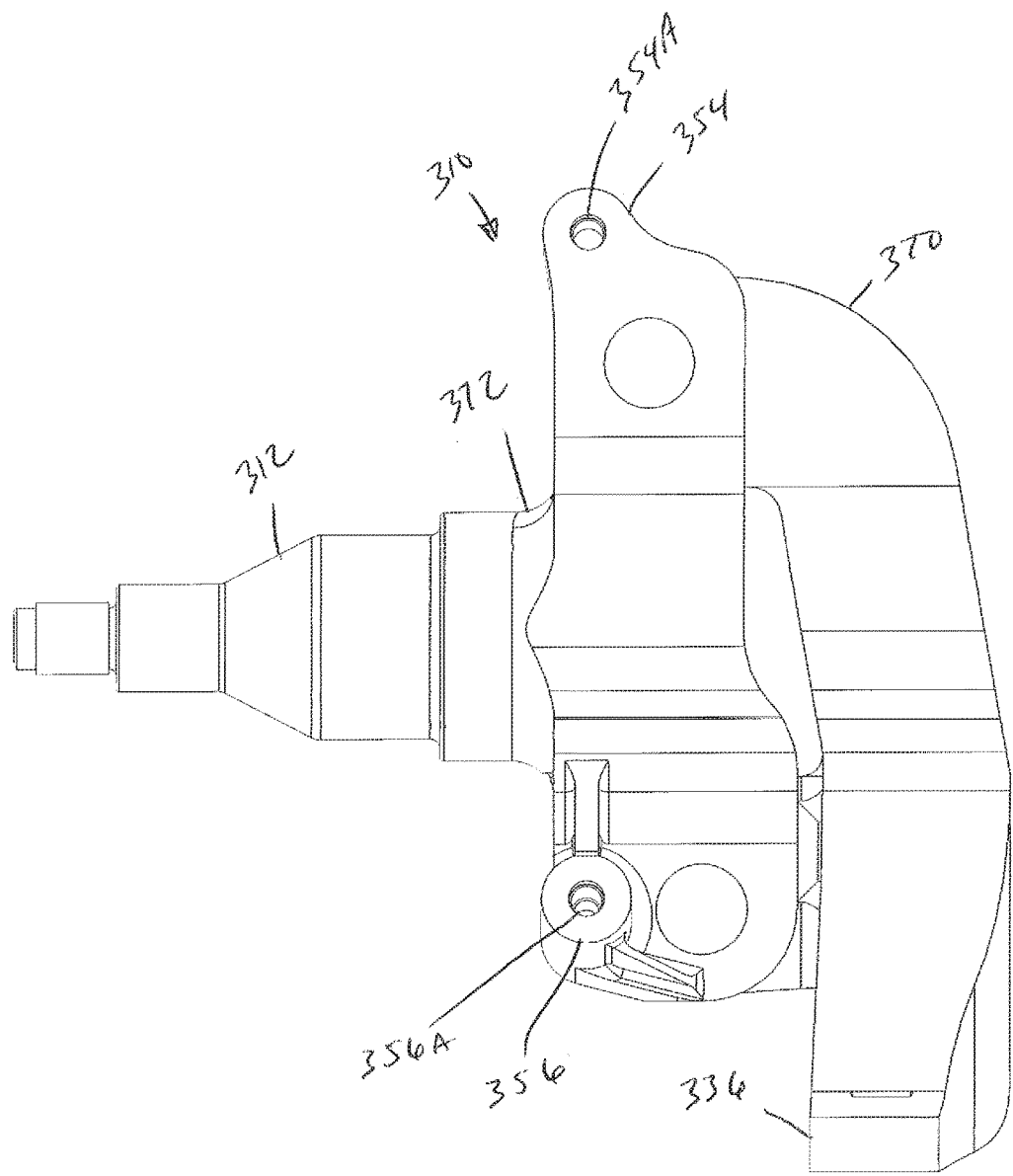
FIG. 27 is a right elevational view of the transducer body of FIG. 23.

Referring to FIGS. 21 and 22 standoffs (projections) 300 inhibit separation of support members 270 and 272 in the event that one or more of the transducer elements 220A-220D experience catastrophic failure. Referring in particular to FIG. 22, where one of the standoffs 300 is illustrated, the standoff 300 includes a stud or bolt 302 mounted to support member 270. The stud 302 extends through the gap 275 formed between the support members 270 and 272 and extends into the support member 272. The stud 302 includes an enlarged head 304 herein located in a recess 306 provided in support member 272. In the embodiment illustrated, the stud 302 also extends through a sleeve 308 that in turn extends through an aperture or bore 311 formed in the support member 272. The sleeve 308 is of size to allow an annular space between the outer surface of the sleeve 308 and an inner surface of the bore 311. In this manner, the stud 302 and sleeve 308 will move freely within the bore 311 with movement of the support member 270 relative to the support member 272. However, in the event of catastrophic failure in one or more of the transducer elements 220A-220D, the enlarged head 304 will contact surfaces forming the recess 306 and will prevent further separation of the support members 270 and 272 relative to each other. As illustrated in FIG. 21, a plurality of standoffs (projections) 300 are provided so as to also inhibit rotation as well as complete separation of the support member 270 relative to the support member 272 in the event of catastrophic failure of the transducer elements 220A-220D.

The transducer elements 220A-220D operate in a similar manner to elements 20A-20D described above so as to sense motion of the support member 270 relative to the support member 272 in six degrees of freedom.

FIGS. 23-30 illustrate a wheel support 310 for rotationally supporting the rotor assembly 14, described above, on a vehicle not shown. It should be noted that the embodiment illustrated in FIGS. 23-30 have elements similar to the embodiment of FIGS. 1-13. Components having similar function in the embodiment of FIGS. 23-30 have reference numbers increased by 300.

The wheel support 310 includes a spindle 312. The spindle 312 is coupled to a transducer body 316 of the wheel support 310. The transducer body 316 includes a plurality of transducer elements, herein illustrated as four transducer elements 320A, 320B, 320C and 320D that can include any form of sensing elements such as but not limited to strain gauges. More than four transducer elements can be provided if desired. The transducer body 16 having the sensing elements operably coupled to the transducer elements 320A-320D can thus provide forces and moments applied to the spindle 312 as the vehicle travels along a road.

Figure 1:
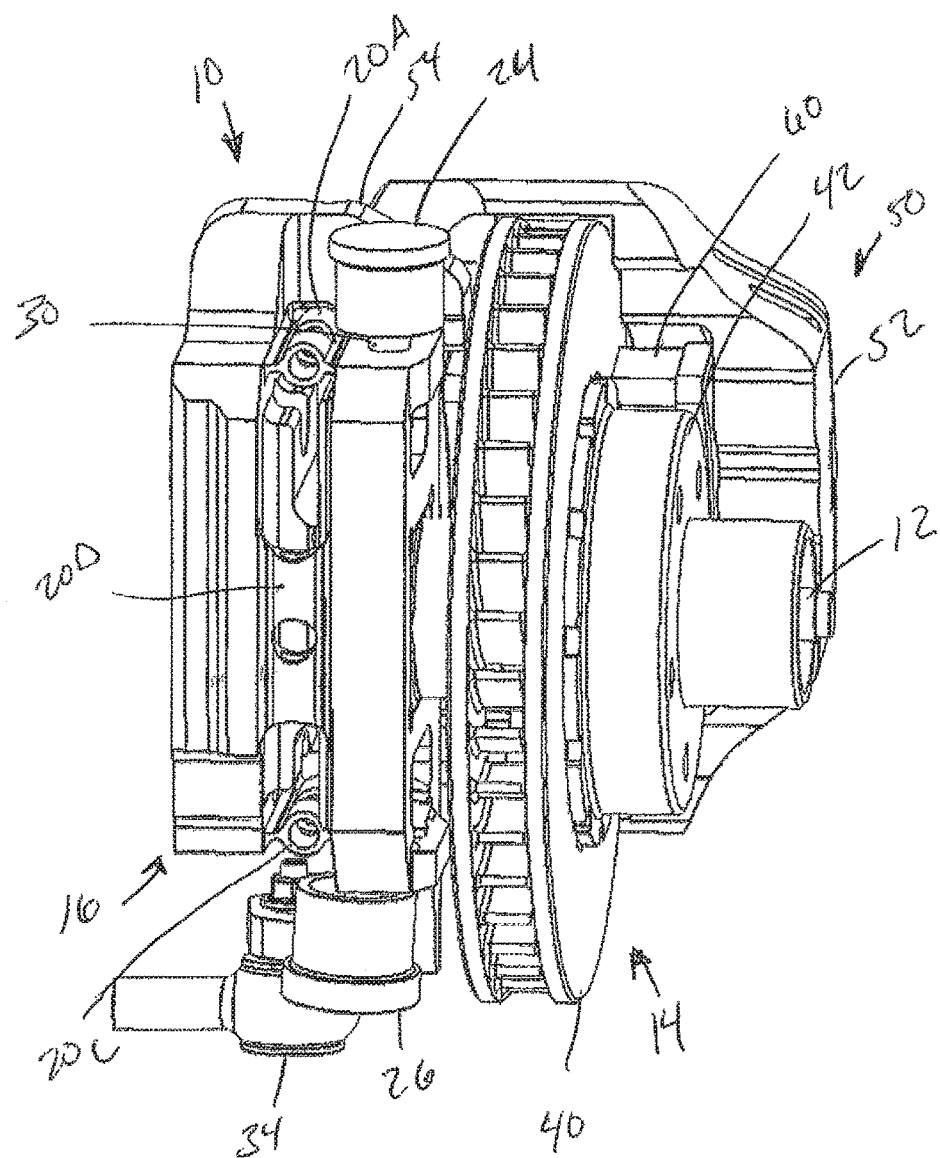
FIG. 1 is a perspective view of a transducer body functioning as a wheel support for a rotor assembly.

The wheel support 310 is mounted to the vehicle (not shown) with the upper ball joint 24 and the lower ball joint 26, which were illustrated in FIGS. 1-3. The lower ball joint 26 extends through an aperture 328 in the wheel support 310, while the upper ball joint 24 extends through an aperture 330 in the wheel support 310. In the embodiment illustrated, the wheel support 310 is located on a corner of the vehicle that enables the wheel assembly to be steered as such, the tie-rod coupling 34 can be mounted to a lever arm 336 of the wheel support 310 through an aperture 338 provided in the lever arm 336 Like the first embodiment, the support member 370 includes a rigid support structure that connects a portion 370A to which the upper ball joint 24 is mounted and a portion 370B to which the lower ball joint 26 is mounted, i.e. a back portion 370C disposed behind the spindle 312. In this embodiment, the support member 370 is disposed on a side of the support member 372 opposite the spindle 312.

The caliper assembly 52 of the brake assembly 50, again illustrated in FIGS. 1-2 can be mounted to the wheel support 310 using caliper support flanges 354 and 356 on the wheel support 310, each having associated mounting apertures 354A and 356A.

Generally, the transducer body 316 includes first and second support members 370 and 372 wherein the transducer elements 320A-320D provide the mechanical couplings between the support members 370 and 372. The spindle 312 is fixedly secured to the support member 372, and in a preferred embodiment, being integrally formed therewith as a single unitary body.

In this embodiment, the support member 370 is joined to the support member 372 with two pairs of transducer elements 320A,320B and 320C,320D that extend in opposite directions away from a vertical plane that includes the axis of the spindle 312. The transducer elements 320A,320B connect the portion 370A (herein configured to receive the upper ball joint 24) to the support member 372, while the transducer elements 320C,320D connect the portion 370B (herein configured to receive the lower ball joint 26) to the support member 372. In a preferred embodiment, each of the axes of each pair of transducer element pairs 320A, 320B and 320C, 320 are parallel to each other, and in a further preferred embodiment, each of the axes of each pair of transducer element pairs 320A, 320B and 320C, 320 are aligned on a common center axis.

Although the transducer elements 320A-320D can take other forms such as beams, in a particular advantageous embodiment, each transducer element is tubular including a plurality of flat, outwardly facing surfaces upon which strain sensors such as strain gauges can be mounted. For instance referring to FIG. 29, loads with respect to mutually orthogonal axes 321 can be obtained from a plurality strain gauges. Shear strain gauges can be provided on pairs of parallel flat surfaces. A first pair of flat surfaces (one surface indicated at 323) can include strain gauges 325 connected for example in a Wheatstone bridge to provide an indication of a load parallel to axis Y Likewise, a second pair of flat surfaces 327 and 329 can include strain gauges similar to strain gauges 325 connected for example in a Wheatstone bridge to provide an indication of a load parallel to axis Z. Axial strain gauges 331 can be provided on surfaces 333 between the surfaces having the shear strain gauges and connected in a suitable Wheatstone bridge to provide an indication of a load parallel to X axis. Moments about each of the axes can be obtained from the linear loads obtained from the shear strain gauges indicated above. As described above, there are multiple pairs of outwardly facing surfaces some of which are formed orthogonal to each other, the surfaces can include strain gauges, for instance, configured to sense strain in shear or axial loads. However, this is but one form. If desired, strain gauges could be configured to measure bending of the transducer element such as if the transducer element is a solid, for example, square shaft in cross-section.

Figure 28:
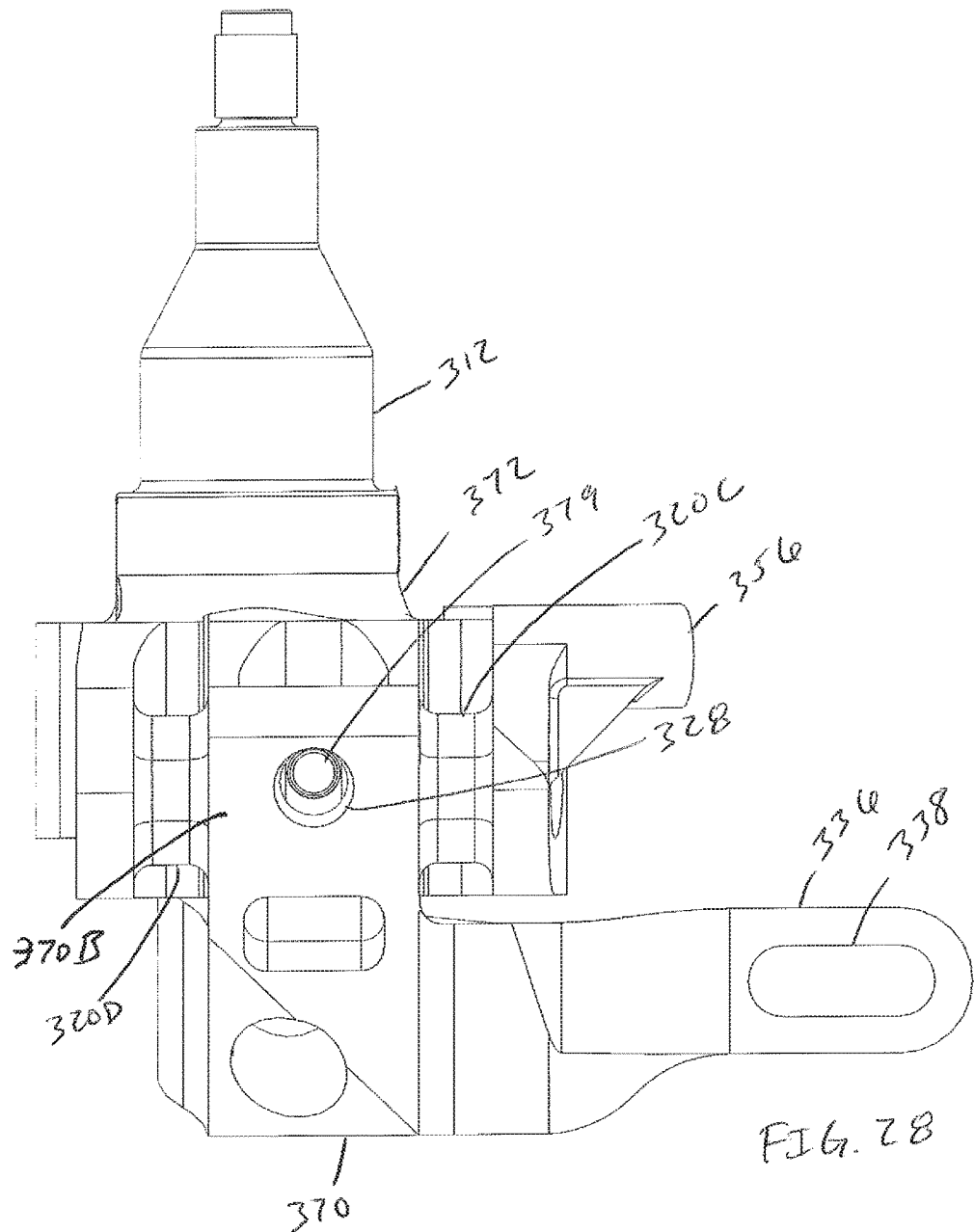
FIG. 28 is a bottom view of the transducer body of FIG. 23.
Figure 29:
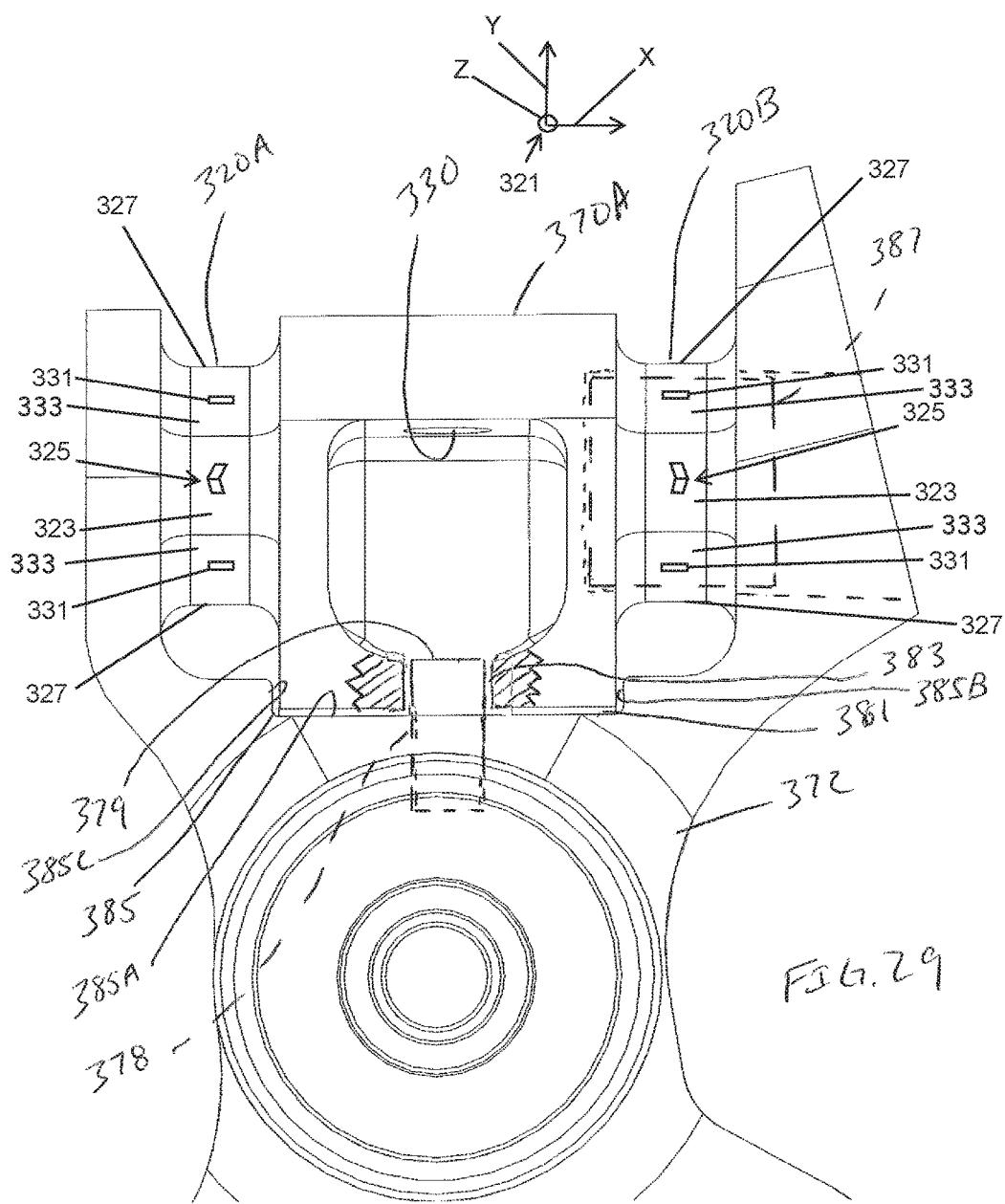
FIG. 29 is an enlarged view of a portion of the transducer body of FIG. 23 with portions removed.
Figure 30:
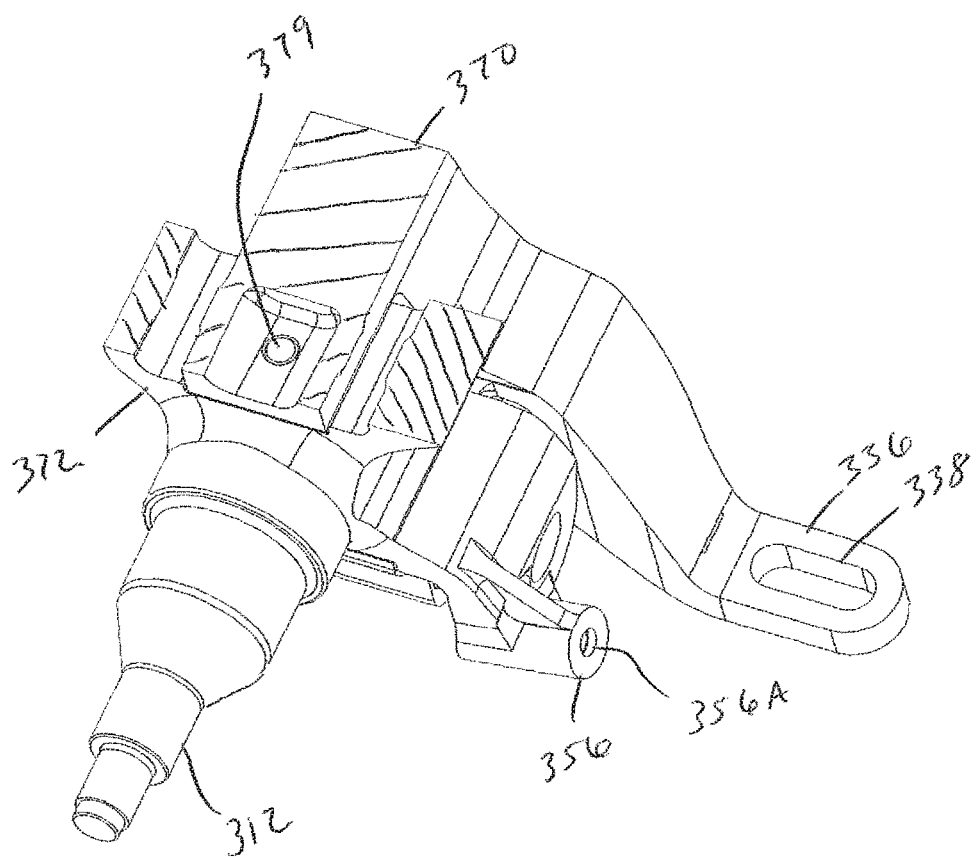
FIG. 30 is a sectional view of the transducer body taken along lines 30-30 of FIG. 23.

Referring to FIGS. 28-30, upper and lower standoffs or studs (projections) 379 inhibit separation of support members 370 and 372 in the event that one or more of the transducer elements 320A-320D experience catastrophic failure. Referring in particular to FIGS. 29-30, where one (upper) of the studs 379 is illustrated, the stud 379 is secured to support member 372 and extends through a gap 381 formed between the support members 370 and 372 and extends into a bore 383 of the support member 370 that is larger than the stud 379 so as to provide an annular space about the stud 379. In this manner, the stud 379 will move freely within the bore 383 with movement of the support member 372 relative to the support member 370. However, in the event of catastrophic failure in one or more of the transducer elements 320A-320D, the stud 379 will contact inner surfaces of the bore 383. Optionally, the support member 370 also has an end portion extending into a recess 385 of the support member 372. Hence, upon catastrophic failure in one or more of the transducer elements 320A-320D, a lower surface 385A, or portion thereof, of the recess 385 may contact the support member 370 as well as side surfaces 385B, 385C, or portions thereof, may also contact support member 370 to prevent further separation of the support members 370 and 372 relative to each other. A similar arrangement is provided on the lower portion of the wheel support 310. FIG. 28 illustrates the lower stud 379. Referring back to FIG. 29, each of the studs 379 is pressed into an aperture 378 in the support member 372 using the associated apertures 28 and 30 provided for the ball joints. Having both the upper and lower studs 379 arranged in the manner described will inhibit separation of the support members 370 and 372.

It should be noted standoffs or studs can be located in other portions of the wheel support 310. For instance, illustrated with dashed lines is a standoff 387 located within the transducer element 320B. In particular, the standoff 387 can be secured to support member 370 and extend within the transducer element 320B and into an aperture 389 in support member 372 that is larger than the standoff 387. In such an embodiment, a standoff 387 would be provided for each of the transducer elements 320A-320D. Hence, the use of standoffs or studs 379 as described has fewer components.

Figure 31:
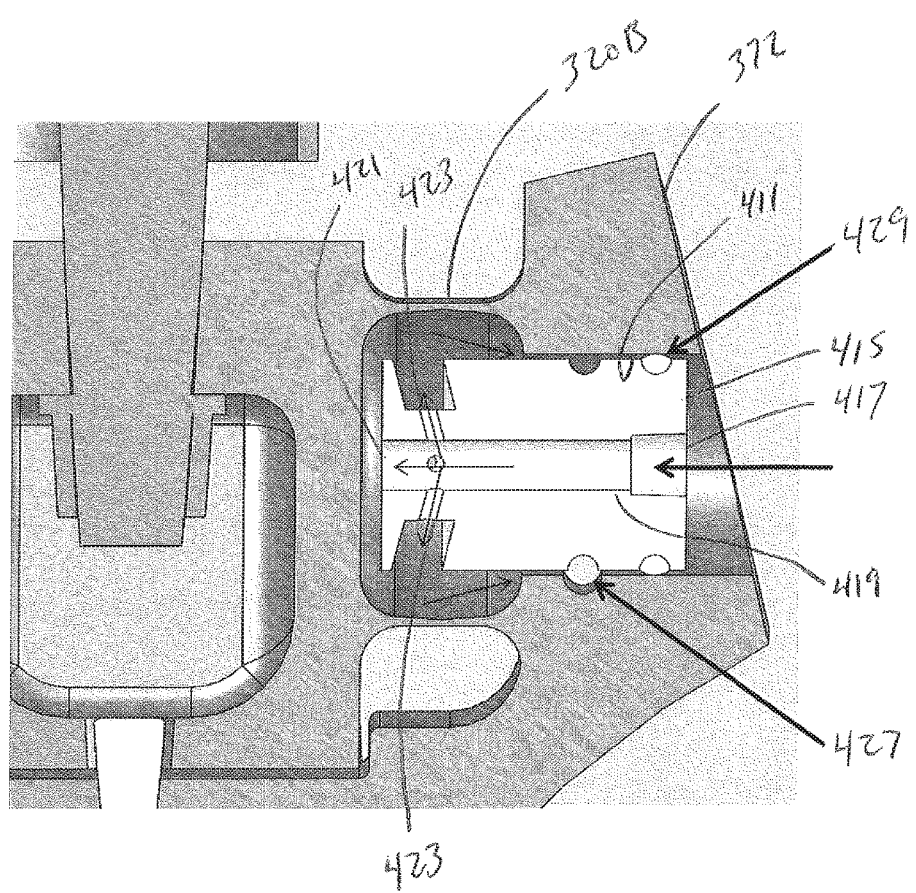
FIG. 31 is a schematic sectional view of a portion of the transducer body of FIG. 23.

In addition, use of the studs 379 rather than standoffs 387 allows the transducer elements 320A-320D to be cooled if desired. Referring to FIG. 31, transducer element 320B includes a plug 415 secured in a mounting aperture 411 with passageways for circulating a cooling fluid (liquid or gas) into and out of the transducer element 320B. The plug 415 includes a first port 417 fluidly connected to a central passageway 419 that in turn has one or more internal openings such as end opening 421 and side openings 423. Cooling fluid for example entering port 417 is discharged through the one or more openings 421 and/or 423 so as to come into contact with inner surfaces of the transducer element 320B. An annular space between an outer surface of the plug 415 and the mounting aperture 411 for the plug 415 allows the cooling fluid to flow out of a second port 427. An o-ring 429 can be provided on the plug 415 to sealing mate with the mounting aperture 411. In the embodiment illustrated, it should be noted that although each of the transducer elements 320A-320D are tubular, a back wall is provided making each of the tubular structures a cavity. The presence of the back walls is optional. If desired, a removable plug can be provided in place of the back walls.

As described above particularly with respect to the embodiment of FIGS. 1-13, the caliper 52 is carried by the support member 372, while the steering lever arm 336 is carried by the support member 370. It advantageous to couple a portion of the support member configured to support the upper ball joint to a portion of the support member configured to support the lower ball joint due to the higher loads seen by the lower ball joint, which is the function of the support member 370 (70 in the embodiment of FIGS. 1-13). In the embodiment of FIGS. 1-13, the spindle 12 extends through the aperture 80 provided in the support member 70 so side portions 70A and 70B perform this coupling and the support member 70 having the ball joints supports is the outermost support member with respect to the center of the vehicle. Whereas, in the embodiment of FIGS. 23-30 the support member 370 is effectively behind the support member 372 or the innermost support member, in the embodiment of FIGS. 23-30, transducer element pairs 320A, 320B and 320C, 320 can be aligned with ball joint apertures 330 and 328, respectively. In other words with reference to FIG. 24, each axis of each pair of transducer element pairs, or a center axis 319 of transducer elements 320A, 320B can be aligned with an axis 330A of aperture 330 so as to intersect (e.g. orthogonally), or at least be proximate to each other (i.e. to cross each other within the diameter of aperture 330). In a similar manner, each axis of each pair of transducer element pairs, or a center axis 323 of transducer elements 320C, 320D can be aligned with an axis 328A of aperture 328 so as to intersect (e.g. orthogonally), or at least be proximate to each other (to cross each other within the diameter of aperture 328).

If desired, in order to provide cooling for the brake assembly 50 and in particular the rotor disc 40, the support member 372 includes an upper aperture 390 and a lower aperture 392 that open toward a rear surface of the rotor disc 40. Air circulation through the apertures 390 and 392 can be provided through openings 394 formed between the transducer elements 320A-320D and support member 372.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A wheel support having a transducer body comprising:
   a first support member having a spindle configured to support a wheel assembly for rotation about an axis of the spindle and a brake caliper;
   a second support member is configured to be secured to a suspension component of a vehicle; and
   a plurality of transducer elements connecting the first support member and the second support member.

2. The wheel support of claim 1 wherein the second support member includes a first portion configured to receive an upper ball joint and a second portion configured to receive a lower ball joint of the vehicle.

3. The wheel support of claim 2 wherein the second support member includes a rigid support structure connecting the first portion to the second portion.

4. The wheel support of claim 3 wherein the second support member is disposed on a side of the first support member opposite the spindle.

5. The wheel support of claim 2 wherein the plurality of transducer elements comprise a first pair of transducer elements extending in opposite directions connecting the first portion to the first support member and a second pair of transducer elements extending in opposite directions connecting the second portion to the first support member.

6. The wheel support of claim 5 wherein each of the transducer elements comprise a tubular structure having a center axis.

7. The wheel support of claim 6 wherein axes of each of the pairs of transducer elements are parallel to each other.

8. The wheel support of claim 7 wherein axes of each of the pairs of transducer elements extend along a common axis.

9. The wheel support of claim 6 wherein the first portion includes a first aperture having a first axis that is proximate or intersects with each of the axes of the first pair of transducer elements and wherein the second portion includes a second aperture having a second axis that is proximate or intersects with each of the axes of the second pair of transducer elements.

10. The wheel support of claim 6 wherein each of the tubular structures comprise a cavity configured to receive cooling fluid.

11. The wheel support of claim 10 and further comprising at least one plug to seal the cavity.

12. The wheel support of claim 11 wherein the plug includes a first port and a passageway extending into and opening within the cavity.

13. The wheel support of claim 12 wherein the plug includes a second port fluidly coupled to the cavity.

14. The wheel support of claim 1 wherein the spindle is configured to support a non-driven wheel assembly.

15. The wheel support of claim 1 wherein the spindle comprises an aperture and is configured for a driven wheel assembly, the aperture being of size for a shaft to extend through to drive the wheel assembly.

16. The wheel support of claim 1 wherein the transducer elements are spaced apart from each other and disposed about the axis of the spindle.

17. The wheel support of claim 16 wherein the transducer elements are spaced apart from each other at equal angular intervals about the axis of the spindle.

18. A wheel support having a transducer body comprising:
a first support member having a spindle configured to support a wheel assembly for rotation about an axis of the spindle;
a second support member;
a plurality of transducer elements connecting the first support member and the second support member;
wherein one of the first support member and the second support member are configured to be mounted to a vehicle and support the vehicle in part on the spindle; and
a projection extending from one of the first and second support members into an aperture in the other support member with clearance to allow the projection to move without contacting an inner surface of the aperture, the projection contacting a surface of the other support member so as to retain the first and second support members together or limit movement between the first and second support members.

19. The wheel support of claim 1 and further comprising a plurality of spaced apart projections extending from one of the support members into spaced apart apertures in the other support member with clearance to allow the projections to move without contacting an inner surface of an associated aperture, the projections contacting a surface of the other support member so as to retain the first and second support members together or limit movement between the first and second support members.

20. The wheel support of claim 1 wherein the second support member includes a lever arm configured to receive a steering coupling of the vehicle.

21. A wheel support having a transducer body comprising:
a first support member having a spindle configured to support a wheel assembly for rotation about an axis of the spindle, wherein the spindle comprises an aperture and is configured for a driven wheel assembly, the aperture being of size for a shaft to extend through to drive the wheel assembly, and wherein the first support member is configured to support a brake caliper;
a second support member configured to be secured to an axle housing through which the shaft extends; and
a plurality of transducer elements connecting the first support member and the second support member.

22. The wheel support of claim 21 wherein the transducer elements are spaced apart from each other and disposed about the axis of the spindle.

* * * * *